United States Patent
Iwasaki et al.

(10) Patent No.: US 10,839,525 B2
(45) Date of Patent: Nov. 17, 2020

(54) INFORMATION PROCESSING APPARATUS, DATA COLLECTION METHOD, AND DATA COLLECTION SYSTEM

(71) Applicant: FUJITSU LIMITED, Kawasaki (JP)

(72) Inventors: Kenji Iwasaki, Koga (JP); Jun Ogawa, Kawasaki (JP); Makoto Kubota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 75 days.

(21) Appl. No.: 16/382,306

(22) Filed: Apr. 12, 2019

(65) Prior Publication Data

US 2019/0347807 A1    Nov. 14, 2019

(30) Foreign Application Priority Data

May 14, 2018   (JP) .................................. 2018-093384

(51) Int. Cl.
  *G06T 7/246* (2017.01)
  *G06T 7/292* (2017.01)
  *G06K 9/00* (2006.01)

(52) U.S. Cl.
  CPC .......... *G06T 7/246* (2017.01); *G06K 9/00771* (2013.01); *G06T 7/292* (2017.01)

(58) Field of Classification Search
  CPC .................. G06T 7/246; G06T 7/292; G06T 2207/10016; G06T 2207/30196; G06K 9/00771; G06K 9/6262
  USPC .......................................................... 382/103
  See application file for complete search history.

(56) References Cited

U.S. PATENT DOCUMENTS

| | | | |
|---|---|---|---|
| 10,422,871 B2 * | 9/2019 | Matsumoto | G06T 7/246 |
| 2008/0240573 A1 | 10/2008 | Nakamura et al. | |
| 2010/0290671 A1 | 11/2010 | Shimizu | |
| 2011/0091117 A1 * | 4/2011 | Sakamoto | G06K 9/4609 382/218 |
| 2014/0232636 A1 * | 8/2014 | Hara | G06K 9/00671 345/156 |

FOREIGN PATENT DOCUMENTS

| | | |
|---|---|---|
| JP | 2002-123739 | 4/2002 |
| JP | 2008-250687 | 10/2008 |
| JP | 2010-267030 | 11/2010 |

* cited by examiner

*Primary Examiner* — Juan A Torres
(74) *Attorney, Agent, or Firm* — Fujitsu Patent Center

(57) ABSTRACT

An information processing apparatus includes a memory configured to store a recognition result, accuracy and timing of an image captured at a point, and a processor coupled to the memory and the processor configured to specify the image configured to include a designated recognition object, and search for the image having a same recognition result as the recognition object by referring to the memory, based on the point and timing at which the specified image has been captured and movement speed information of the recognition object.

13 Claims, 20 Drawing Sheets

FIG. 6

| RECOGNITION OBJECT TYPE | MOVEMENT SPEED [km/h] |
|---|---|
| PERSON | 6 |
| CAR | 18 |
| ... | ... |

MOVEMENT CHARACTERISTIC TABLE ~130

600-1
600-2

INFORMATION PROCESSING APPARATUS, DATA COLLECTION METHOD, AND DATA COLLECTION SYSTEM

CROSS-REFERENCE TO RELATED APPLICATION

This application is based upon and claims the benefit of priority of the prior Japanese Patent Application No. 2018-093384, filed on May 14, 2018, the entire contents of which are incorporated herein by reference.

FIELD

The embodiments discussed herein are related to an information processing apparatus, a data collection method, and a data collection system.

BACKGROUND

There is a system in which image recognition applications distributed over a wide area perform image recognition processing for input images of cameras installed nearby and record the recognition results and the images in a nearby data store, and a model learner on a cloud relearns a recognition model based on the recorded recognition results and images. Images containing recognition objects failed in recognition are used for the relearning of the recognition model.

In the related art, there is a technique for extracting a recognition object which can be repeatedly recognized, as a learning feature, based on a plurality of pieces of recognition information on the same place stored in a storage unit when image information at the same place is recognized plural times. There is also a technique for obtaining a similarity between a movement route of an image-capturing device and a movement route of a moving body, determining a degree of relevance between a designated image among images captured by the image-capturing device and the moving body based on the obtained similarity, and registering information indicating the degree of relevance in association with the designated image. There is also a technique for calculating a predicted response rate in a case of transmitting advertisement mails to respective customers, selecting an advertisement mail with the highest expected response, and transmitting the advertisement mail from a mail server to a personal computer.

Related techniques are disclosed in, for example, Japanese Laid-open Patent Publication Nos. 2008-250687, 2010-267030, and 2002-123739.

SUMMARY

According to an aspect of the invention, an information processing apparatus includes a memory configured to store a recognition result, accuracy and timing of an image captured at a point, and a processor coupled to the memory and the processor configured to specify the image configured to include a designated recognition object, and search for the image having a same recognition result as the recognition object by referring to the memory, based on the point and timing at which the specified image has been captured and movement speed information of the recognition object.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an explanatory view illustrating an example of storage contents of a movement characteristic table;

DESCRIPTION OF EMBODIMENTS

In the related art, it is difficult to collect data suitable for learning. For example, in collecting images containing recognition objects failed in recognition, since the contents of the image are visually determined, it takes time and efforts to check all the images of cameras installed in various places.

Hereinafter, embodiments of techniques capable of efficiently collecting data suitable for learning will be described with reference to the accompanying drawings.

First Embodiment

First, the system configuration of a data collection system 100 according to a first embodiment will be described. Here, a case will be described as an example where the data collection system 100 is applied to a distributed processing system by an edge computing.

Figure 1:
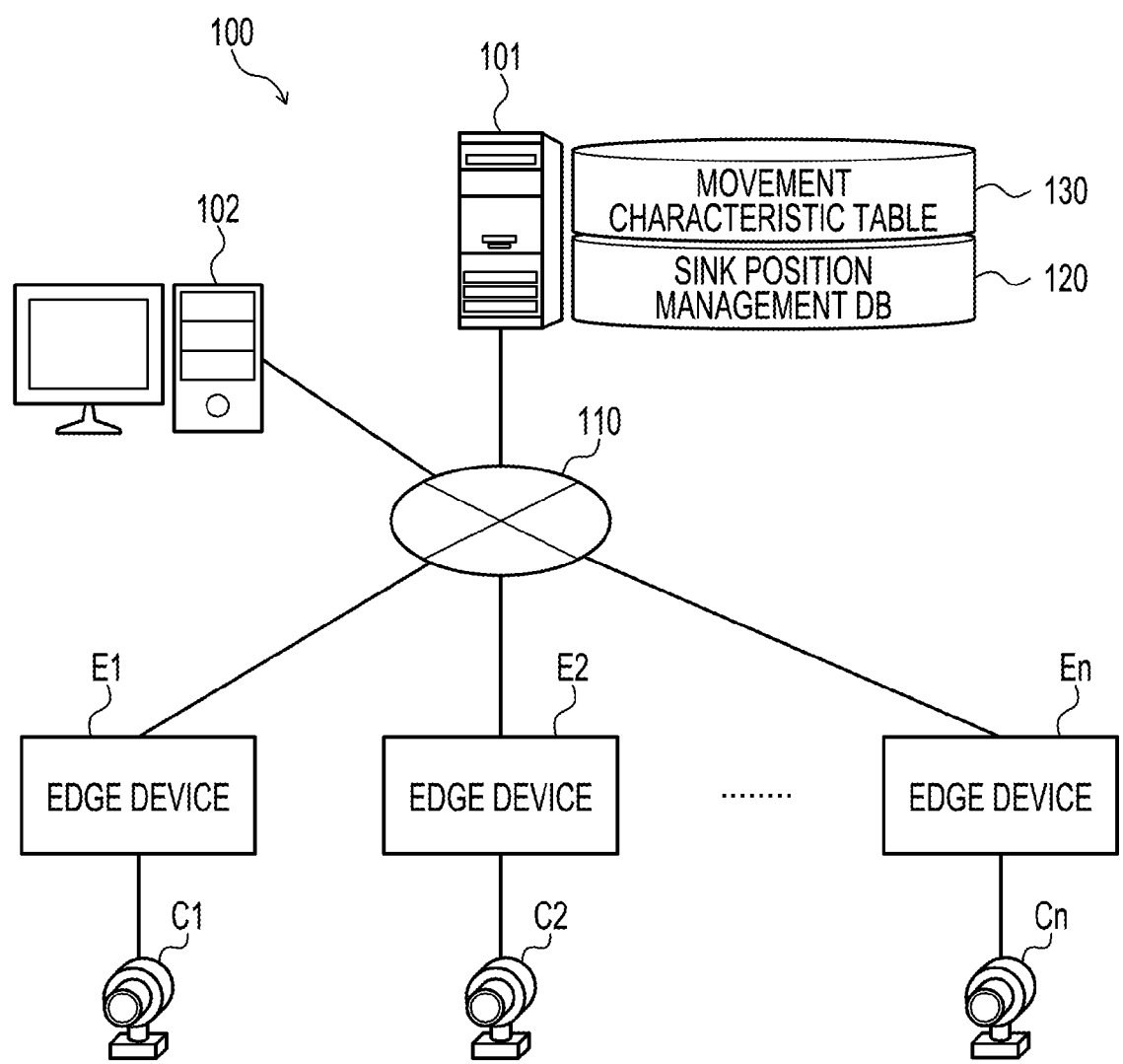
FIG. 1 is an explanatory view illustrating an example of a system configuration of a data collection system according to a first embodiment.

FIG. 1 is an explanatory view illustrating an example of the system configuration of the data collection system 100 according to the first embodiment. As illustrated in FIG. 1, the data collection system 100 includes an information processing apparatus 101, an administrator terminal 102, and edge devices E1 to En (n: a natural number of 1 or more). In the data collection system 100, the information processing apparatus 101, the administrator terminal 102, and the edge devices E1 to En are communicably interconnected via a wired or wireless network 110. The network 110 is, for example, a LAN (Local Area Network), a WAN (Wide Area Network) or the Internet.

Here, the information processing apparatus 101 is a computer that has a sink position management DB (Database) 120 and a movement characteristic table 130, and collects data to be used for learning of an image recognition model. For example, the information processing apparatus 101 is a cloud computing server.

An image recognition recognizes images using a technique of image processing. As one method of image recognition, there is a classification method in which an object to be recognized is determined in an image. An image recognition model is information for recognizing an object contained in an image. The image recognition model is generated by a model learner (e.g., a model learner ML illustrated in FIG. 2 to be described later) by learning based on various image data.

The data collected by the information processing apparatus 101 and used for learning of the image recognition model may be, for example, image data itself to be used for learning, or information indicating, for example, a storage location of image data used for learning. The storage contents of the sink position management DB 120 and the movement characteristic table 130 will be described later with reference to FIGS. 5 and 6.

The administrator terminal 102 is a computer used by an administrator of the data collection system 100. The administrator terminal 102 is, for example, a PC (personal computer) or a tablet terminal.

The edge devices E1 to En are computers that are installed at different places and perform various processes. The edge devices E1 to En are edge servers in edge computing and are located closer to a user than the information processing device 101 (cloud). The edge device Ei, for example, is a server, a PC, an access point or a smartphone.

In the following description, an edge device among the edge devices E1 to En may be referred to as an "edge device Ei" (i=1, 2, . . . , N).

The edge device Ei receives image data of an image captured by a camera Ci. The camera Ci is an image capturing device that captures a still image or a moving image. The camera Ci is installed in various places such as a store, a house, a station, a factory, a road, and a sidewalk. The edge device Ei and the camera Ci may be directly connected to each other by a short-range wireless communication or a wired communication, or may be connected to each other via a gateway device (not illustrated). Two or more cameras Ci may be connected to the edge device Ei.

Specifically, for example, upon receiving the image data of the camera Ci, the edge device Ei executes an image recognition processing on the image data using an image recognition application. The image recognition application (hereinafter, referred simply to as an "image application") is an application for determining a recognition object in an image.

[Example of Operation of Data Collection System 100]

Next, an example of an operation of the data collection system 100 will be described. Here, it is assumed that a wide area distributed data management method is used. The wide area distributed data management method is a method in which raw data (image data) is managed by an edge device Ei in the vicinity of a generation source and then metadata (attribute/position information) necessary for data search is managed in a cloud.

Figure 2:
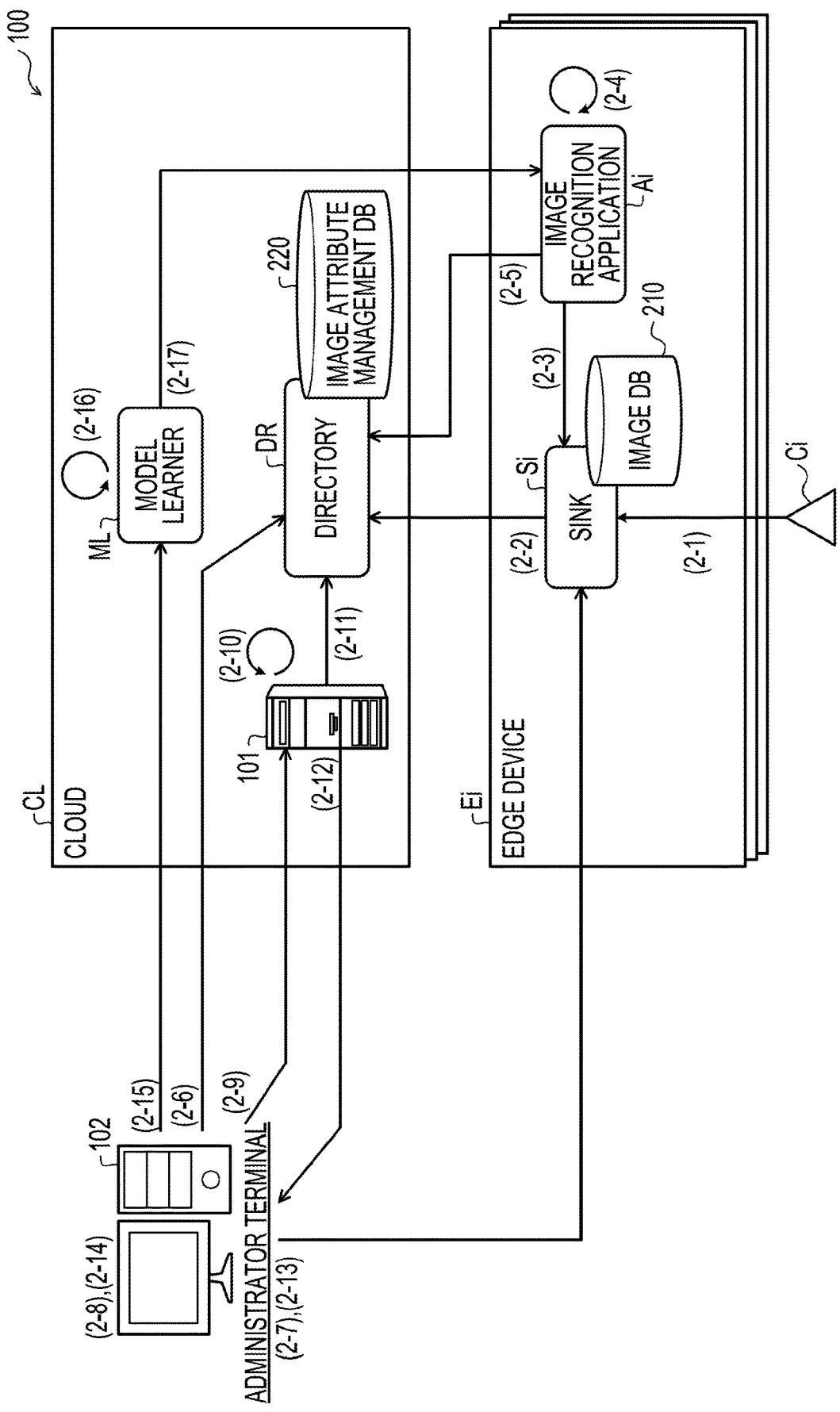
FIG. 2 is an explanatory view illustrating an example of an operation of the data collection system.

FIG. 2 is an explanatory view illustrating an example of an operation of the data collection system 100. In FIG. 2, a cloud CL is a server group that implements a cloud computing. The cloud CL includes an information processing apparatus 101, a model learner ML, and a directory DR. The model learner ML is software that learns the image recognition model.

The directory DR is a functional unit that has an image attribute management DB 220 and manages metadata (attribute/position information) of image data. The storage contents of the image attribute management DB 220 will be described later with reference to FIG. 8. The model learner ML and the directory DR may be implemented by the information processing apparatus 101 or may be implemented by another computer connected to the information processing apparatus 101.

The edge device Ei includes a sink Si and an image recognition application Ai. The sink Si is a functional unit that has an image DB 210 and manages image data of an image captured by the camera Ci. The storage contents of the image DB 210 will be described later with reference to FIG. 7. The image recognition application Ai uses an image recognition model to determine a recognition object in an image. The edge device Ei may include a plurality of sinks Si.

In order to relearn the image recognition model for an image failed in recognition, the data collection system 100 collects information on an image containing a recognition object failed in recognition. For example, although "cat" is contained in raw data (image data), when the cat is determined as "dog" by the image recognition application Ai, the image data containing "cat" is collected and the relearning of the image recognition model is performed with the collected image data as an input.

Meanwhile, what is actually contained in the image is visually checked. However, in collecting the information of the image containing the recognition object failed in recognition, it takes time and efforts when the administrator of the data collection system 100 visually checks all the images stored in each sink Si one by one.

Therefore, it is desirable to reduce the number of images to be visually checked by the administrator, by thinning out the images on the basis of a standard. For example, it is conceivable to thin out the images using the accuracy of recognition result. The accuracy is a degree indicating the certainty of the recognition result. More specifically, for example, it is conceivable to extract only images having a certain value or more of accuracy among images recognized as containing the recognition object failed in recognition.

However, the recognition result of the image is a result in the image recognition model in which misrecognition occurred. Therefore, there is a possibility that many images not containing the recognition object to be learned (recognition object failed in recognition) are included in the images thinned out using the accuracy. The rate at which the images not containing the recognition object to be learned are included in the thinned images increases as the erroneous recognition rate in the current image recognition model increases.

For example, when the recognition rate of "cat" is 60%, assuming that all the images whose recognition result is "cat" are acquired, about 40% of the images are images in which no cat is contained. In addition, when the erroneous recognition rate of the image recognition model is high, there is also a possibility that many images containing the recognition object to be learned are actually included even in images with low accuracy.

In this case, the images of the recognition object failed in recognition may not be sufficiently collected, which further may cause a problem that the image recognition model may not be relearned. Therefore, in the present embodiment, a data collection method for efficiently collecting data suitable for learning of the image recognition model will be described.

Hereinafter, an example of an operation of the data collection system 100 in a case of collecting information of images containing the recognition object failed in recognition by image recognition processing will be described.

(2-1) The camera Ci captures an image and outputs the image data of the captured image to the sink Si. The output timing of the camera Ci may be arbitrarily set. For example, the camera Ci may capture an image at regular time intervals of about several seconds.

(2-2) Upon receiving the image data from the camera Ci, the sink Si registers the image data in the image DB 210 and registers the metadata of the image in the image attribute management DB 220 of the directory DR. The metadata includes attribute information of the image and position information of the sink Si which is an image management source.

The attribute information includes an image ID, a registration date/time, a recognition result, and an accuracy. However, at this point of time, the attribute information does not include the recognition result and the accuracy. The position information includes a sink ID and an address. The metadata (attribute information and position information) will be described in more detail later with reference to FIG. 8.

(2-3) The image recognition application Ai acquires image data to be processed from the sink Si. The image data to be processed may be searched with, for example, the registration date/time as a key. However, each time the sink Si receives the image data in the above item (2-2), the image recognition application Ai may acquire the image data.

(2-4) The image recognition application Ai uses the image recognition model to execute the image recognition processing on the acquired image data. The result of the image recognition processing includes the recognition result and the accuracy. The recognition result indicates a recognition object recognized as being contained in the image. The accuracy is a degree indicating the certainty of the recognition result. Here, the accuracy is represented by a value from 0 to 1, with 1 being the highest and 0 being the lowest.

(2-5) The image recognition application Ai registers the recognition result and the accuracy as the image attribute information in the directory DR.

(2-6) The administrator terminal 102 accesses the directory DR and randomly extracts images captured by the camera Ci. Any method of the related art may be used to randomly extract the images. Specifically, for example, the administrator terminal 102 may randomly extract the image attribute management information in the image attribute management DB 220 illustrated in FIG. 8 to be described later.

(2-7) The administrator terminal 102 acquires the image data of the randomly extracted images from the sink Si and displays the acquired image data together with the recognition result. As a result, it is visually determined by the administrator whether or not the recognition result of the image recognition application Ai is correct.

(2-8) The administrator terminal 102 receives the result of the determination as to whether or not the recognition result of the image recognition application Ai is correct according to an operation input by the administrator of the data collection system 100. In addition, when receiving a determination result indicating that the recognition result of the image recognition application Ai is incorrect, the administrator terminal 102 further receives a designation of a correct recognition object contained in the images.

(2-9) When receiving a determination result indicating that the recognition result of the image recognition application Ai is incorrect, the administrator terminal 102 transmits a learning image search instruction to the information processing apparatus 101. The learning image search instruction includes, for example, an image ID, a registration date/time, and a recognition object type of a correct determination image. The correct determination image is an image for which it is determined by the administrator of the data collection system 100 that the recognition result of the image recognition application Ai is incorrect and a correct recognition object is designated.

The recognition object type indicates the type of designated and correct recognition object. In addition, the learning image search instruction may include position information (sink ID and address) of the sink Si which is the source of the correct determination image. In addition, the position information of the sink Si which is the source of the correct determination image may be specified from, for example, the randomly extracted image attribute management information.

(2-10) Upon receiving the learning image search instruction from the administrator terminal 102, the information processing apparatus 101 adjusts the search condition for searching for images to be used for learning of the image recognition model. The search condition is, for example, a threshold value of the accuracy when searching for an image containing the designated recognition object.

Specifically, for example, the information processing apparatus 101 specifies an image containing the designated recognition object based on the received learning image search instruction. Then, the information processing apparatus 101 adjusts the search condition for searching for an image containing the designated recognition object based on the point and time at which the specified image was captured and the movement speed information of the recognition object.

The movement speed information of the recognition object is information that specifies the speed of movement of the recognition object. For example, the movement speed information indicates the movement speed itself of the recognition object. Further, the movement speed information of the recognition object may indicate the level of the speed at which the recognition object moves, such as, for example, "level 1: fast, level 2: normal, level 3: slow."

Here, an example of an adjustment of the search condition will be described with reference to FIG. 3.

Figure 3:
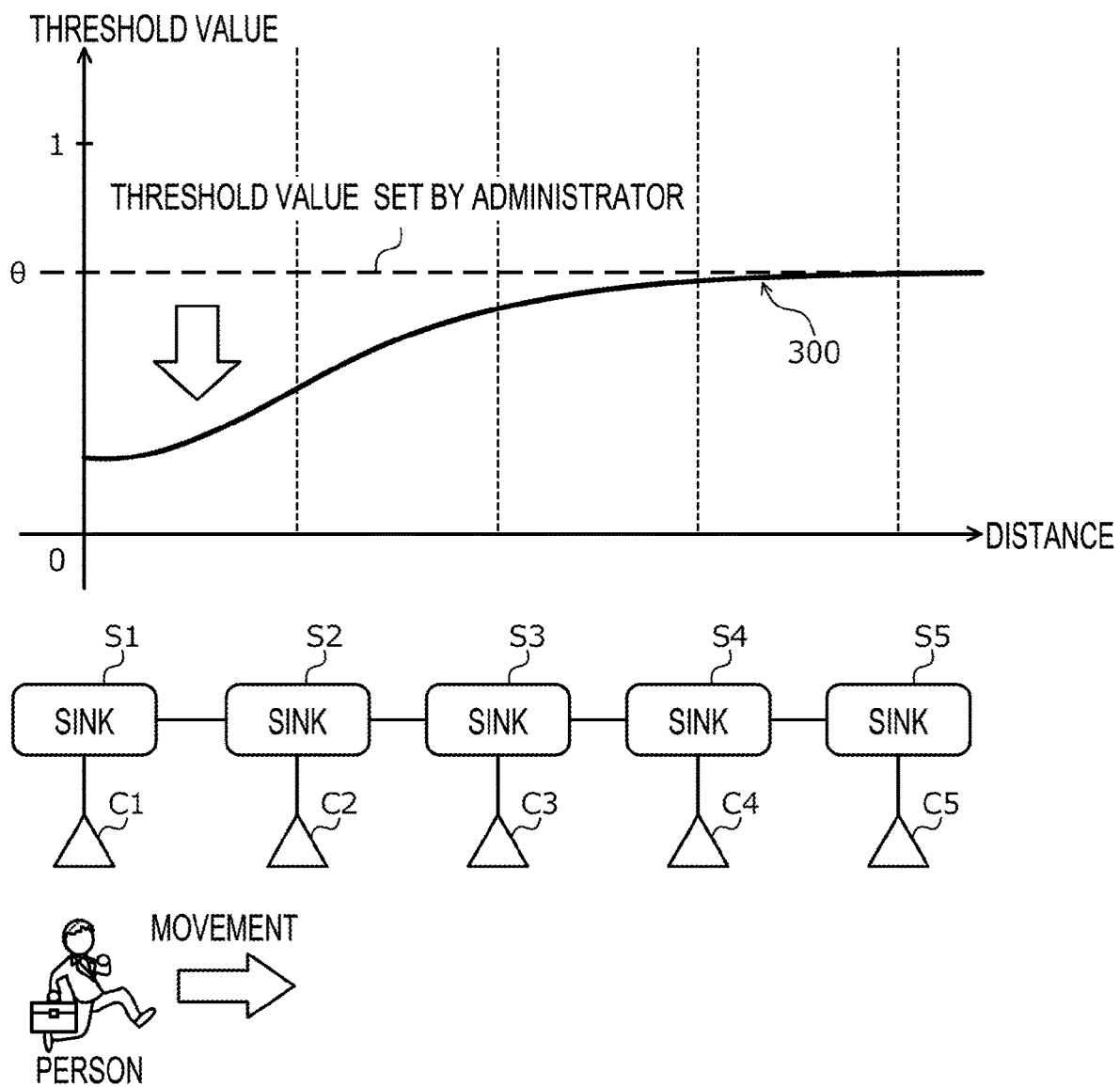
FIG. 3 is an explanatory view illustrating an example of an adjustment of a search condition.

FIG. 3 is an explanatory view illustrating an example of an adjustment of the search condition. Here, as the search condition for searching for an image to be used for learning of the image recognition model, a condition that the recognition result is the same as a designated recognition object and an image whose accuracy of the recognition result is larger than a threshold value A is searched for is assumed. The designated recognition object is a recognition object failed in recognition in the image recognition processing.

Here, the fact that the recognition result of an image is correct means that a recognition object exists at the time and point at which the image was captured. The recognition object may include, for example, a human (person), a vehicle such as a car or a train, living things such as a cat or a bird, or things carried by the human, vehicle or living things. Therefore, a movable range of the recognition object may be limited from the movement speed of the recognition object.

In other words, it is possible to estimate the probability that a recognition object of which image is captured at a certain point at certain timing exists at another point within a predetermined period of time from this timing. In this case, it may be said that the probability of existence of the recognition object even at a place away from the certain point increases with the increase in the speed of the recognition object. For example, when "cat" is contained in an image at a certain point at certain timing, it may be estimated that there is a high possibility that "cat" exists within 100 meters from the certain point for 10 seconds before and after the certain timing.

It may be said that there is a high possibility of searching for an image containing the recognition object at a point where the probability that the recognition object exists is higher even when the threshold value A of the accuracy as the search condition for the point is lowered. In addition, the probability of existence of the recognition object tends to be lowered as a physical distance from the point at which an image of the recognition object is captured becomes longer.

Therefore, the information processing apparatus 101 calculates the probability of existence of an image containing the recognition object which is captured at each point, based on a distance between points and the movement speed information of the recognition object. The existence probability may be obtained, for example, by using a normal distribution function that depends on the speed at which the recognition object moves. Then, the information processing apparatus 101 adjusts the threshold value A of the accuracy of each point to be smaller based on the existence probability calculated for each point.

More specifically, for example, the information processing apparatus 101 adjusts the threshold value A at each point so that the threshold value A becomes lower than a preset threshold value θ as the calculated existence probability becomes higher. The threshold value θ is a lower limit threshold value for thinning out images having the accuracy of the threshold value θ or smaller and is set by, for example, the administrator of the data collection system 100.

As a result, the threshold value A at each point may be adjusted to be smaller than the threshold value θ set by the administrator as the physical distance from a specific point at which an image containing a designated recognition object was captured become shorter. In the example of FIG. 3, it is assumed that an image containing a designated recognition object "person" is captured by a camera C1 corresponding to a sink S1.

In this case, as the physical distance from the sink S1 increases, the existence probability of the image containing the recognition object "person" decreases. Therefore, as illustrated in a graph 300, the threshold value A corresponding to each of the sinks S1 to S5 is adjusted so that the threshold value A becomes smaller than the threshold value θ set by the administrator as the physical distance from the sink S1 becomes shorter.

Referring back to FIG. 2, (2-11) the information processing apparatus 101 refers to the image attribute management DB 220 of the directory DR and uses the adjusted retrieval condition to search for an image having the same recognition result as the designated recognition object. The image attribute management DB 220 is an example of a storage unit that stores a recognition result, accuracy, and time of an image captured at a point in association with the point. The point corresponds to, for example, a sink Si.

(2-12) The information processing apparatus 101 outputs information indicating the search result. Specifically, for example, the information processing apparatus 101 may output, to the administrator terminal 102, the image ID of a searched image and the position information of a sink Si storing the image data of the searched image in association with a designated recognition object.

(2-13) Upon receiving the information indicating the search result, the administrator terminal 102 acquires the image data of the searched image from the sink Si.

(2-14) The administrator terminal 102 displays the acquired image data and receives a selection of an image to be used for learning of the image recognition model. Here, the image to be selected is an image for learning the features of the recognition object designated by the administrator and is also an image in which the designated recognition object is actually contained.

(2-15) The administrator terminal 102 instructs the model learner ML to relearn the image recognition model for the designated recognition object, by inputting the image data of the selected image to the model learner ML.

(2-16) The model learner ML relearns the image recognition model for the designated recognition object based on the input image data.

(2-17) The model learner ML transmits the relearned image recognition model to the image recognition application Ai of each sink Si. As a result, the image recognition model in the image recognition application Ai of each sink Si is updated.

In this way, according to the data collection system 100, in consideration of the speed of movement of a recognition object whose existence is confirmed at a certain point, it is possible to search for an image containing the recognition object among images captured at the respective points. Thus, it is possible to efficiently collect images containing an object failed in recognition in the image recognition processing and efficiently relearn the image recognition model.

[Example of Hardware Configuration of Information Processing Apparatus 101]

Figure 4:
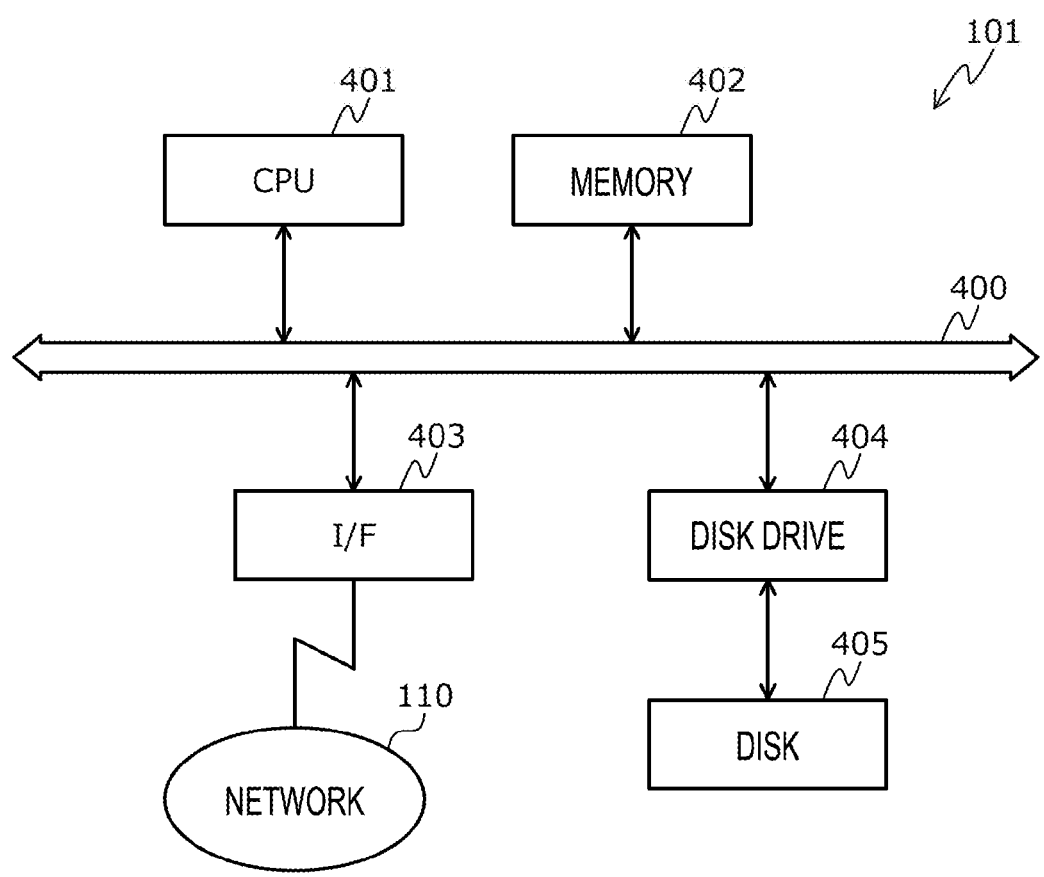
FIG. 4 is a block diagram illustrating an example of a hardware configuration of an information processing apparatus.

FIG. 4 is a block diagram illustrating an example of a hardware configuration of the information processing apparatus 101. As illustrated in FIG. 4, the information processing apparatus 101 includes a CPU (Central Processing Unit) 401, a memory 402, an I/F (Interface) 403, a disk drive 404, and a disk 405, which are interconnected by a bus 400.

Here, the CPU 401 is responsible for controlling the entire information processing apparatus 101. The CPU 401 may have a plurality of cores. The memory 402 includes, for example, a ROM (Read Only Memory), a RAM (Random Access Memory), and a flash ROM. Specifically, for example, the flash ROM stores an OS (Operating System) program, the ROM stores application programs, and the RAM is used as a work area of the CPU 401. The programs stored in the memory 402 are loaded onto the CPU 401 to cause the CPU 401 to execute a coded process.

The I/F 403 is connected to the network 110 via a communication line, and is connected to external computers (e.g., the administrator terminal 102 and the edge devices E1 to En illustrated in FIG. 1) via the network 110. The I/F 403 is responsible for interface between the network 110 and the apparatus and controls input/output of data from the external computers. As the I/F 403, for example, a modem or a LAN adapter may be adopted.

The disk drive 404 controls read/write of data from/in the disk 405 under control of the CPU 401. The disk 405 stores data written under control of the disk drive 404. As the disk 405, for example, a magnetic disk or an optical disk may be adopted.

In addition to the above-described components, the information processing apparatus 101 may include, for example, an SSD (Solid State Drive), an input device, and a display. The administrator terminal 102 and the edge devices E1 to En may be also implemented by the same hardware configuration as the information processing device 101. The administrator terminal 102 may further include, for example, an input device and a display, in addition to the above-described components.

[Storage Contents of Sink Position Management DB 120]

Next, the storage contents of the sink position management DB 120 of the information processing apparatus 101 will be described. The sink position management DB 120 is implemented by a storage device such as the memory 402 or the disk 405 illustrated in FIG. 4.

Figure 5:
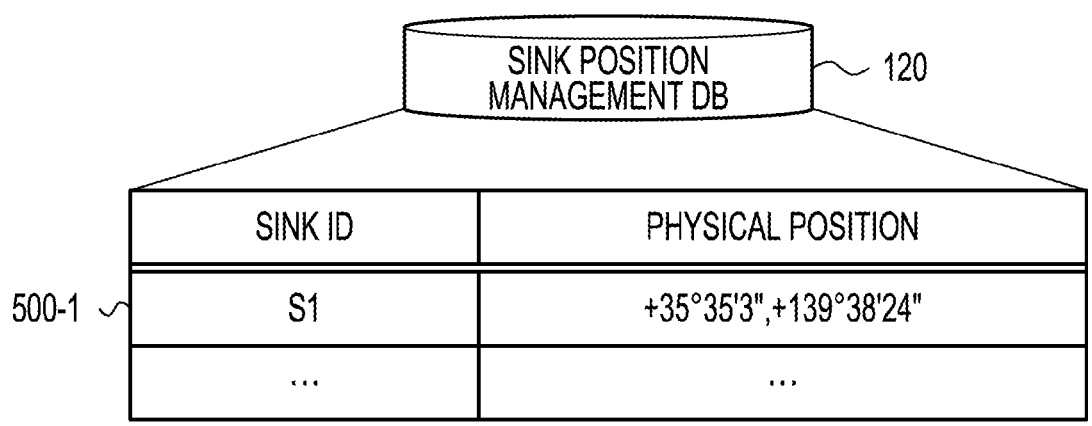
FIG. 5 is an explanatory view illustrating an example of storage contents of a sink position management database (DB)

FIG. 5 is an explanatory view illustrating an example of storage contents of the sink position management DB 120. As illustrated in FIG. 5, the sink position management DB 120 has fields of sink ID and physical position, and stores sink position information (e.g., sink position information 500-1) as a record by setting information in each field.

Here, the sink ID is an identifier for uniquely identifying a sink Si. The physical position indicates the position of the sink Si, that is, the latitude and the longitude of a place where the edge device Ei is installed. The position of the sink Si may be acquired by, for example, a GPS (Global Positioning System).

For example, the sink position information 500-1 indicates the physical position (+35° 35'3", +139° 38'24") of the sink S1.

[Storage Contents of Movement Characteristic Table 130]

Next, the storage contents of the movement characteristic table 130 of the information processing apparatus 101 will be described. The movement characteristic table 130 is implemented by, for example, a storage device such as the memory 402 or the disk 405 illustrated in FIG. 4.

FIG. 6 is an explanatory view illustrating an example of the storage contents of the movement characteristic table 130. As illustrated in FIG. 6, the movement characteristic table 130 has fields of recognition object type and movement speed, and stores movement characteristic information (e.g., movement characteristic information 600-1 and 600-2) as a record by setting information in each field.

Here, the recognition object type is the type of a recognition object. The moving speed is a speed (unit: km/h) at which a recognition object distinguished by the recognition object type moves. As the movement speed, for example, a typical speed of the recognition object is set. For example, the movement characteristic information 600-1 indicates a movement speed "6 [km/h]" of the recognition object type "person."

In the image recognition processing, there is a case where, for example, different type of persons including a male person, a female person, a child, and an adult are distinguished and recognized. In this case, for example, different movement speeds may be set depending on, for example, the gender (male, female) or age (child, adult) for the recognition object type "person."

[Storage Contents of Image DB 210]

Next, the storage contents of the image DB 210 of the sink Si illustrated in FIG. 2 will be described. The image DB 210 is implemented by, for example, a storage device such as a memory or a disk of the edge device Ei.

Figure 7:
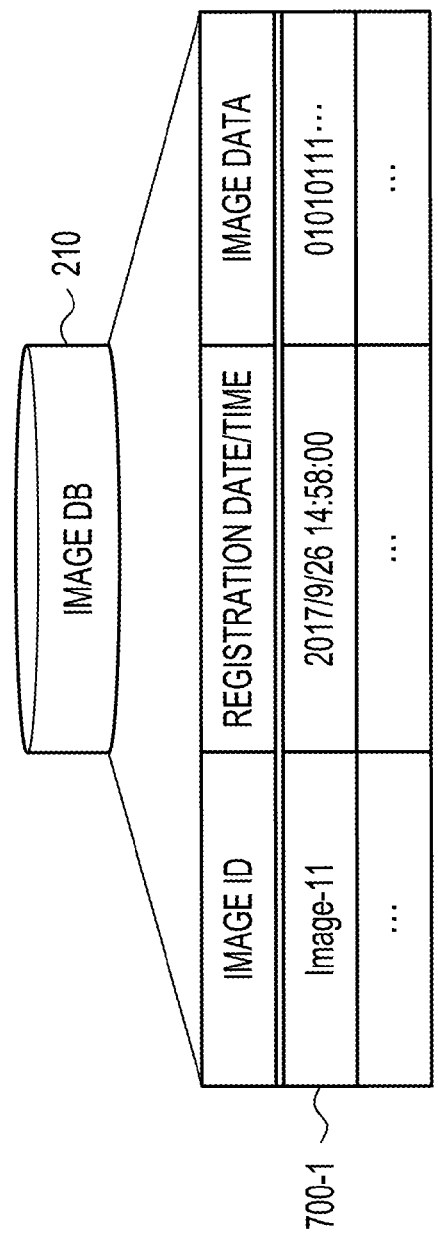
FIG. 7 is an explanatory view illustrating an example of storage contents of an image DB.

FIG. 7 is an explanatory view illustrating an example of the storage contents of the image DB 210. As illustrated in FIG. 7, the image DB 210 has fields of image ID, registration date/time, and image data, and stores image management information (e.g., image management information 700-1) as a record by setting information in each field.

Here, the image ID is an identifier for uniquely identifying an image captured by the camera Ci. The registration date/time indicates the date/time when image data was registered in the image DB 210. The registration date/time corresponds to the date/time when an image was captured by the camera Ci. The image data is image data of the image captured by the camera Ci.

For example, the image management information 700-1 indicates registration date/time "2017/9/26 14:58:00" and image data "01010111 . . . " of an image of an image ID "Image-11."

[Storage Contents of Image Attribute Management DB 220]

Next, the storage contents of the image attribute management DB 220 of the directory DR illustrated in FIG. 2 will be described. The image attribute management DB 220 is implemented by a storage device such as a memory or a disk of a computer (e.g., the information processing apparatus 101) included in the cloud CL.

Figure 8:
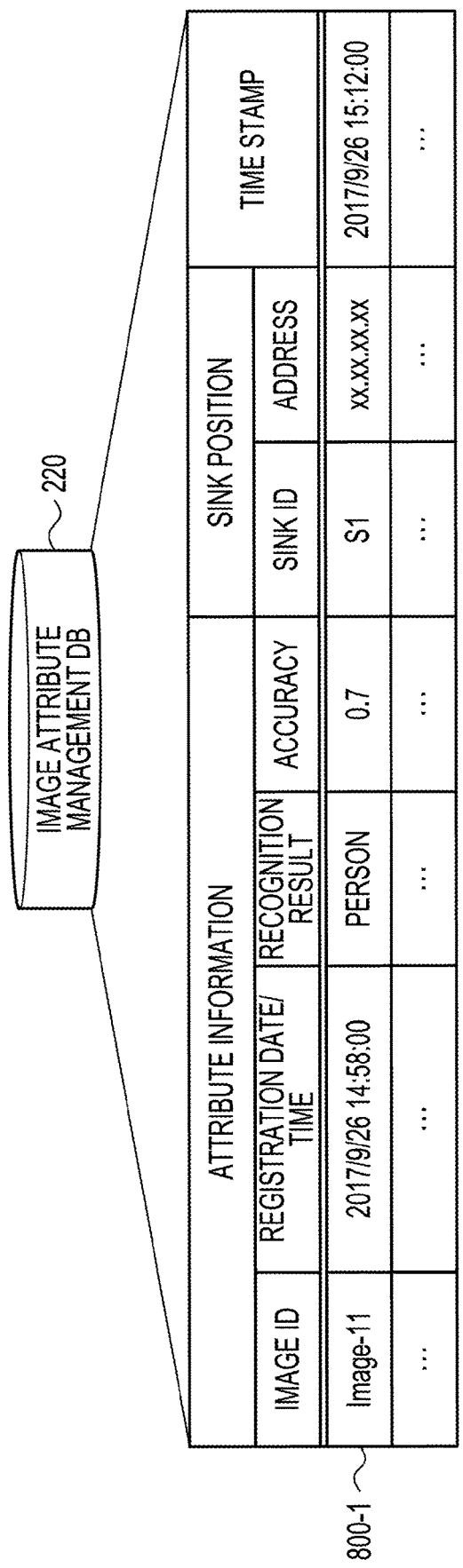
FIG. 8 is an explanatory view illustrating an example of storage contents of an image attribute management DB.

FIG. 8 is an explanatory view illustrating an example of storage contents of the image attribute management DB 220. As illustrated in FIG. 8, the image attribute management DB 220 has fields of attribute information, sink position, and time stamp. The attribute information field has sub-fields of image ID, registration date/time, recognition result, and accuracy. The sink position field has sub-fields of sink ID and address. Image attribute management information (e.g., image attribute management information 800-1) is stored as a record by setting information in each field.

Here, the attribute information is attribute information of an image captured by the camera Ci. Specifically, the image ID is an identifier for uniquely identifying an image captured by the camera Ci. The registration date/time indicates the date/time when the image was captured by the camera Ci. The recognition result indicates a recognition result of an image recognized by the image recognition processing of the image recognition application Ai. The accuracy is a degree indicating the certainty of the recognition result. The accuracy is represented by a value from 0 to 1, with 1 being the highest.

The sink position is position information of a sink Si which is the source of management of the image captured by the camera Ci. Specifically, the sink ID is an identifier for uniquely identifying a sink Si. The address indicates the address of the sink Si. As the address, for example, an IP (Internet Protocol) address of the sink Si is set. The time stamp is the date/time when the image attribute management information (including the recognition result and the accuracy) was registered in the image attribute management DB 220.

For example, the image attribute management information 800-1 indicates the registration date/time "2017/9/26 14:58:00" of an image having an image ID "Image-11," the recognition result "person," and the accuracy "0.7." Further, the image attribute management information 800-1 indicates the address "xx.xx.xx.xx" of the sink S1, which is the image management source of the image ID "Image-11" and the time stamp "2017/9/26 15:00."

[Example of Functional Configuration of Information Processing Apparatus 101]

Figure 9:
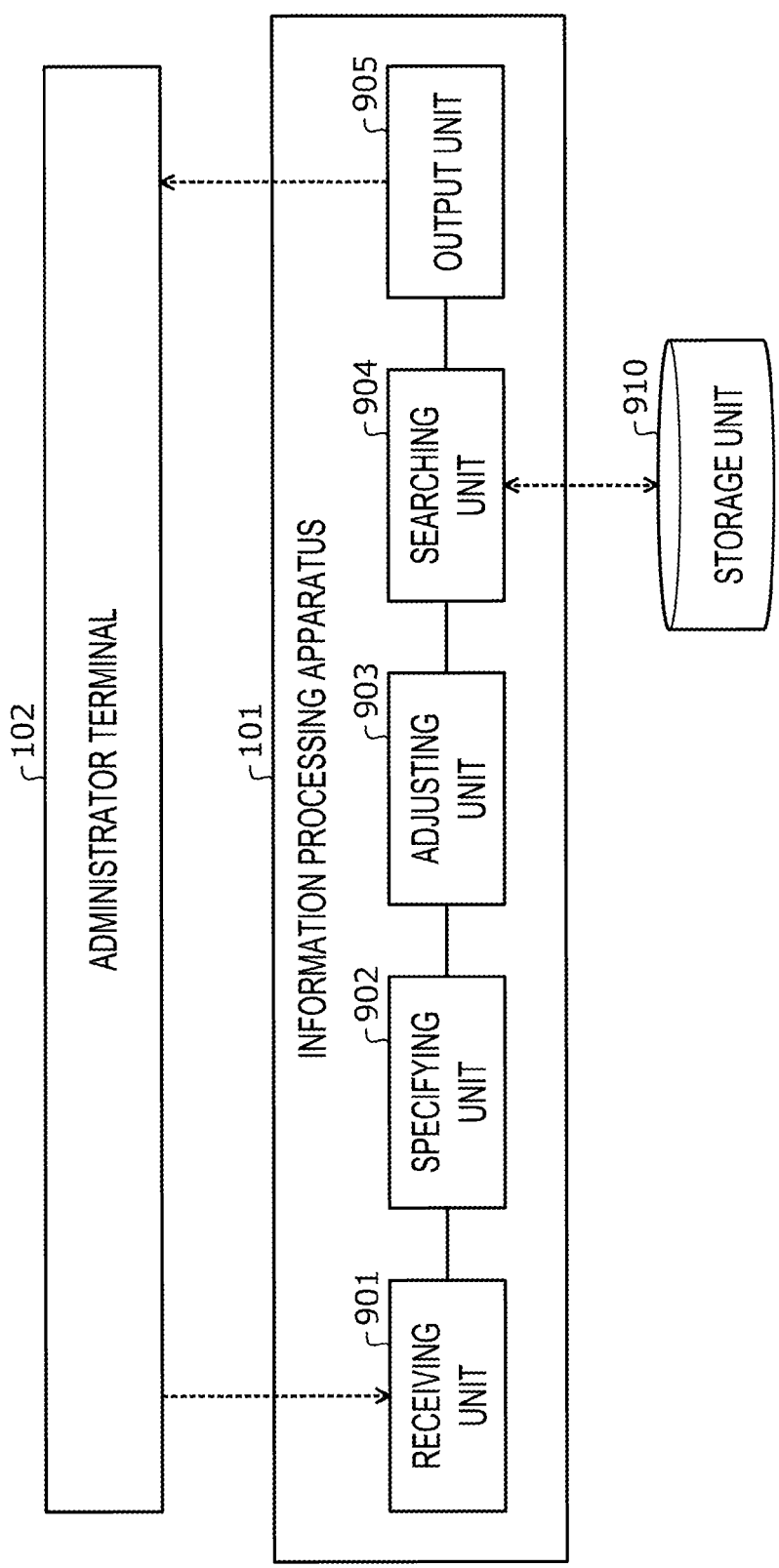
FIG. 9 is a block diagram illustrating an example of a functional configuration of the information processing apparatus.

FIG. 9 is a block diagram illustrating an example of a functional configuration of the information processing apparatus 101. As illustrated in FIG. 9, the information processing apparatus 101 includes a receiving unit 901, a specifying unit 902, an adjusting unit 903, a searching unit 904, and an output unit 905. These units 901 to 905 function as a controller. Specifically, the functions of the units 901 to 905 are implemented by the CPU 401 to execute the programs stored in the storage device such as the memory 402 or the disk 405 illustrated in FIG. 4 or by the I/F 403. The processing results of the functional units are stored in the storage device such as the memory 402 or the disk 405.

The receiving unit 901 receives a designation of a recognition object. The designated recognition object is, for example, an object failed in recognition in the image recognition processing using the image recognition model by the image recognition application Ai. The designation of a recognition object is performed by, for example, an operation input by the administrator of the data collection system 100 in the administrator terminal 102.

Specifically, for example, the receiving unit 901 receives a designation of a recognition object specified from a learning image search instruction, by receiving the learning image search instruction from the administrator terminal 102. The learning image search instruction contains, for example, information indicating an image ID, registration date/time, and designated recognition object of a correct determination image.

The correct determination image is an image for which it is determined by the administrator of the data collection system 100 that the recognition result of the image recognition application Ai is incorrect and a correct recognition object is designated. In addition, the learning image search instruction may include position information (sink ID and address) of the sink Si corresponding to a point at which the correct determination image is captured.

The specifying unit 902 specifies an image containing the designated recognition object. Further, the specifying unit 902 specifies a point and timing at which the specified image was captured. Specifically, for example, the specifying unit 902 specifies a correct determination image specified from an image ID included in the received learning image search instruction as an image containing the designated recognition object.

In addition, for example, the specifying unit 902 specifies a registration date/time included in the received learning image search instruction as a timing at which the specified positive determination image was captured. In addition, for example, the specifying unit 902 specifies a sink specified from the position information (sink ID and address) included in the received learning image search instruction as a point at which the specified correct determination image was captured.

Further, the specifying unit 902 may specify a point (sink Si) and timing (registration date/time) at which the correct determination image is captured, by referring to the image attribute management DB 220 of the directory DR with an image ID included in the received learning image search instruction as a key.

In the following description, a designated recognition object may be sometimes referred to as a "recognition object RO." Further, a sink corresponding to a point at which an image (correct determination image) containing the recognition object RO is captured may be sometimes referred to as a "management source sink Sx of the correct determination image" or simply as a "management source sink Sx" (x=1, 2, . . . , n).

The adjusting unit 903 adjusts a search condition for searching for an image containing a recognition object RO captured at any one of a plurality of points based on the point at which a specified image was captured and the movement speed information of the recognition object RO. Here, the plurality of points are, for example, places where the cameras C1 to Cn illustrated in FIG. 1 are installed. That is, any point of the plurality of points corresponds to a sink Si. Further, the search condition is, for example, the threshold value A of the accuracy.

Specifically, for example, first, the adjusting unit 903 calculates an existence probability Pi based on a distance between the management source sink Sx of the correct determination image and the sink Si and the movement speed information of the recognition object RO. Here, the existence probability Pi is a probability that an image containing the recognition object RO captured by the camera Ci of the sink Si exists. That is, the existence probability Pi indicates a probability that the image containing the recognition object RO is registered in the sink Si.

More specifically, for example, the adjusting unit 903 refers to the sink position management DB 120 illustrated in FIG. 5 to specify the physical position of the management source sink Sx and the physical position of the sink Si. Next, the adjusting unit 903 calculates the distance between the management source sink Sx and the sink Si from the physical position of the specified management source sink Sx and the physical position of the sink Si. Further, the adjusting unit 903 refers to the movement characteristic table 130 illustrated in FIG. 6 to specify the movement speed corresponding to the recognition object RO. Then, the adjusting unit 903 calculates the existence probability Pi using the following expression (1).

Where, the "d" is the distance between the source sink Sx and the sink Si. The "σ" is "v×t." The "v" is the moving speed (unit: km/h) of the recognition object RO. The "t" is a constant number indicating a time difference from a timing when the correct determination image was captured. For example, the "t" may be arbitrarily set depending on how long an image captured within time before and after the timing when the correct determination image was captured is searched. The value of "t" may be set in advance or may be included in the learning image search instruction.

$$P_i = P(d, v, t) = \exp\left(-\frac{d^2}{2\sigma(v, t)^2}\right) \tag{1}$$

Next, the adjusting unit 903 calculates a threshold value Ai of the accuracy based on the calculated existence probability Pi. Here, the threshold value Ai of the accuracy is the threshold value A of the accuracy when searching for an image containing the recognition object RO captured at the sink Si. In more detail, for example, the adjusting unit 903 calculates the threshold value Ai of the accuracy using the following expression (2). Where, θ is a lower limit threshold value set in advance for thinning out images with the accuracy less than the threshold value θ, which corresponds to the initial value of the threshold value Ai. The value of θ may be set in advance or may be included in the learning image search instruction.

$$Ai=A(d, v, t)=\theta \times (1-Pi) \quad (2)$$

Figure 10:
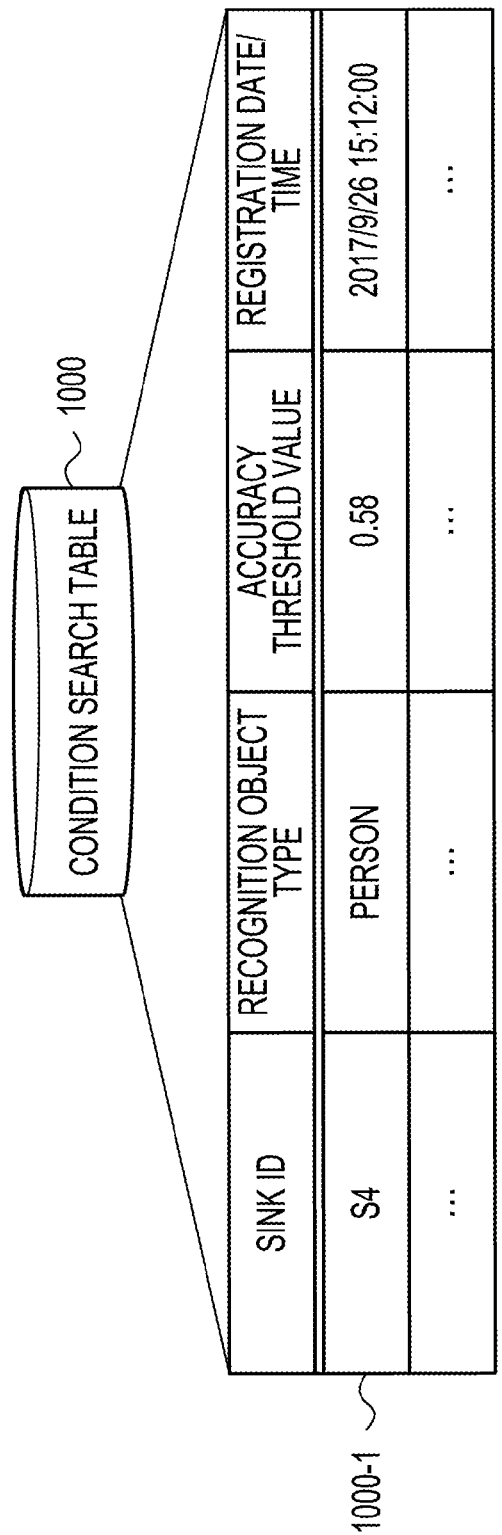
FIG. 10 is an explanatory view illustrating an example of storage contents of a search condition table.

An example of calculation of the threshold value Ai of the accuracy will be described later with reference to FIG. 12. A calculated threshold Ai of the accuracy is stored in, for example, a search condition table 1000 as illustrated in FIG. 10. The search condition table 1000 is implemented by a storage device such as the memory 402 or the disk 405. Here, the storage contents of the search condition table 1000 will be described.

FIG. 10 is an explanatory view illustrating an example of the storage contents of the search condition table 1000. As illustrated in FIG. 10, the search condition table 1000 has fields of sink ID, authentication object type, accuracy threshold value, and registration date/time, and stores search condition information (e.g., search condition information 1000-1) as a record by setting information in each field.

Here, the sink ID is an identifier for uniquely identifying a sink Si. The authentication object type is the type of an authentication object RO. The accuracy threshold value is a threshold value A of the accuracy when searching for an image containing the recognition object RO captured at the sink Si. The registration date/time is the date/time when the correct determination image was registered in the sink Si (image DB 210). The registration date/time corresponds to the date/time when the correct determination image was captured.

For example, the search condition information 1000-1 is a threshold value A4 "0.54" of the accuracy when searching for an image containing a recognition object "person" captured at a sink S4 and the registration date/time "2017/9/26 15:12:00."

Referring back to FIG. 9, based on the search condition (threshold value A of the accuracy) after adjustment for any point of the plurality of points and the timing at which the specified image (correct determination image) was captured, the searching unit 904 refers to the storage unit 910 to search for an image captured at the point and having the same recognition result as the recognition object RO.

Here, the storage unit 910 stores the recognition result, the accuracy, and the time of an image captured at each point in association with each of the plurality of points. The storage unit 910 is, for example, the image attribute management DB 220 of the directory DR. The storage unit 910 may be included in the information processing apparatus 101 or may be included in another computer accessible by the information processing apparatus 101.

Specifically, for example, based on the timing at which the specified correct determination image was captured, the searching unit 904 refers to the image attribute management DB 220 to search for an image having the same recognition result as the recognition object RO and having the accuracy higher than the adjusted threshold value Ai among images registered in the sink Si.

More specifically, for example, the searching unit 904 refers to the search condition table 1000 to specify the accuracy threshold value "A1=0.54," the recognition object type "person," and the registration date/time "2017/9/26 15:12:00" corresponding to the sink S1.

Next, the searching unit 904 sets a search object period according to the specified registration date/time. As the search object period, for example, a period of "t" time before and after the registration date/time is set. The "t" is a constant number included in the above expression (1). For example, the "t" is set to "one hour." The search object period is "2017/9/26 14:12:00-16:12:00." However, the searching unit 904 may set the search object period using a time different from the constant number "t."

Then, the searching unit 904 refers to the image attribute management DB 220 to search for an image which is captured within the set search object period, has the same recognition result as the recognition object RO, and has the accuracy higher than the adjusted threshold value A1 "0.54" among the images registered in the sink S1. That is, the searching unit 904 refers to the image attribute management DB 220 to search for an image having the registration date/time included in the search object period "2017/9/26 14:12:00-16:12:0," the recognition result of "person" and the accuracy greater than "0.54."

Figure 11:
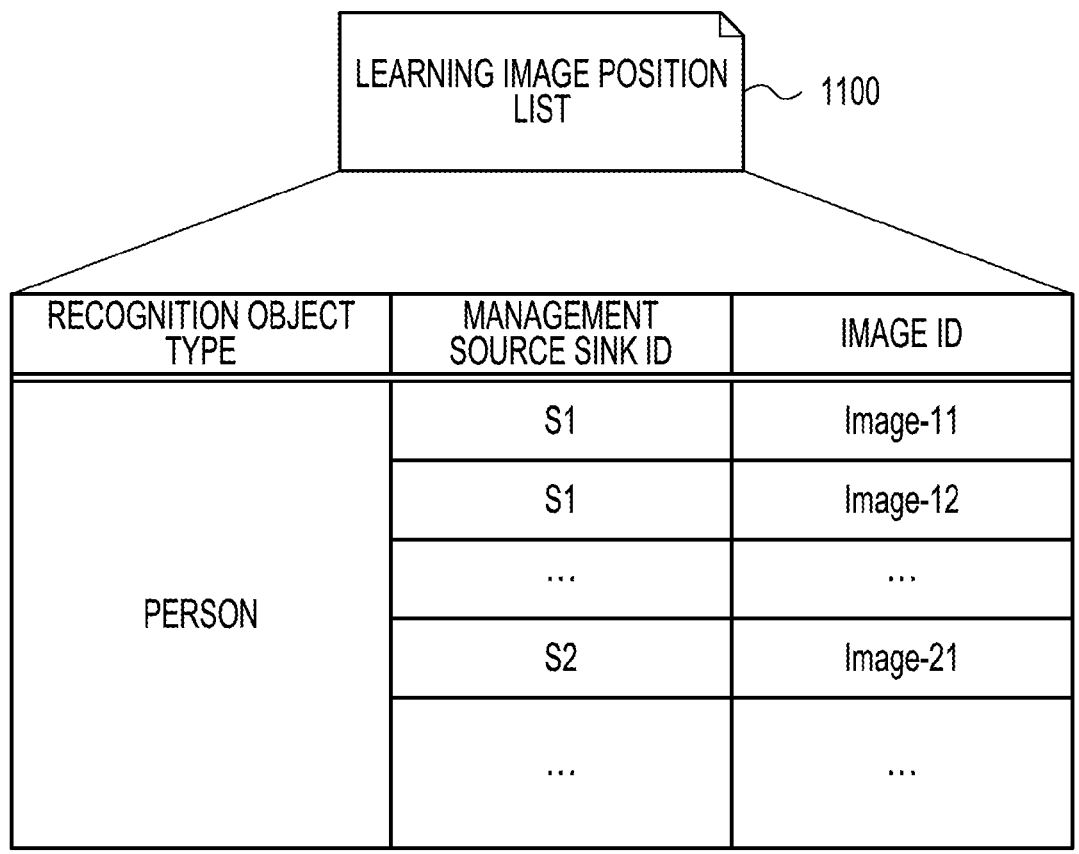
FIG. 11 is an explanatory view illustrating a specific example of a learning image position list.

The searched search result is stored in, for example, a learning image position list 1100 as illustrated in FIG. 11. The learning image position list 1100 is implemented by a storage device such as the memory 402 or the disk 405. Here, a specific example of the learning image position list 1100 will be described.

FIG. 11 is an explanatory view illustrating a specific example of the learning image position list 1100. As illustrated in FIG. 11, the learning image position list 1100 represents a recognition object type, a management source sink ID, and an image ID in association with each other. The recognition object type indicates the type of a recognition object RO. The management source sink ID indicates a sink ID of the sink Si in which an image searched by the searching unit 904 is registered. The image ID indicates an image ID of the image searched by the searching unit 904.

In the example of FIG. 11, the learning image position list 1100 represents image IDs of images searched as containing the authentication object "person" for different sinks Si.

Referring back to FIG. 9, the output unit 905 outputs information indicating the searched result. Examples of the output format of the output unit 905 may include a storage in a storage device such as the memory 402 or the disk 405, transmission to another computer by the I/F 403, displaying on a display device (not illustrated), or printing on a printer (not illustrated).

Specifically, for example, the output unit 905 outputs information specifying an edge device Ei or a sink Si in which the image data of a searched image was registered in association with the recognition object RO. More specifically, for example, the output unit 905 may transmit the learning image position list 1100 as illustrated in FIG. 11 to the administrator terminal 102.

As a result, the administrator of the data collection system 100 may collect the image data used for learning of the image recognition model by referring to the learning image position list 1100.

In the above description, the existence probability Ai is obtained from the movement speed of a recognition object, but the present disclosure is not limited thereto. For example, the information processing apparatus 101 may obtain the existence probability Ai of each sink Si in consideration of the geographical factors around each sink Si.

As an example, it is assumed that there is an entry-prohibited area between the sink S1, which is the management source sink of the correct determination image, and a sink S2. In this case, for example, the information processing apparatus 101 may set the existence probability A1 of the sink S2 to a value (e.g., 0) lower than the probability obtained using the above expression (1). In addition, there is a case where the entry-prohibited area is an area inhibited for vehicles only. In this case, for a recognition object RO of the recognition object type "car," for example, the information processing apparatus 101 may set the existence probability A1 of the sink S2 to a value (e.g., 0) lower than the probability obtained using the above expression (1).

Further, in the above description, a case of collecting data to be used for learning of the image recognition model has been described, but the present disclosure is not limited thereto. For example, the data collection system 100 may collect data to be used for learning of a speech recognition model. The data to be subjected to the speech recognition processing is, for example, voice data of a voice received by a microphone installed in each place.

[Calculation Example of Accuracy Threshold Value Ai]

Next, an example of calculating the threshold value Ai of the accuracy will be described with reference to FIG. 12.

Figure 12:
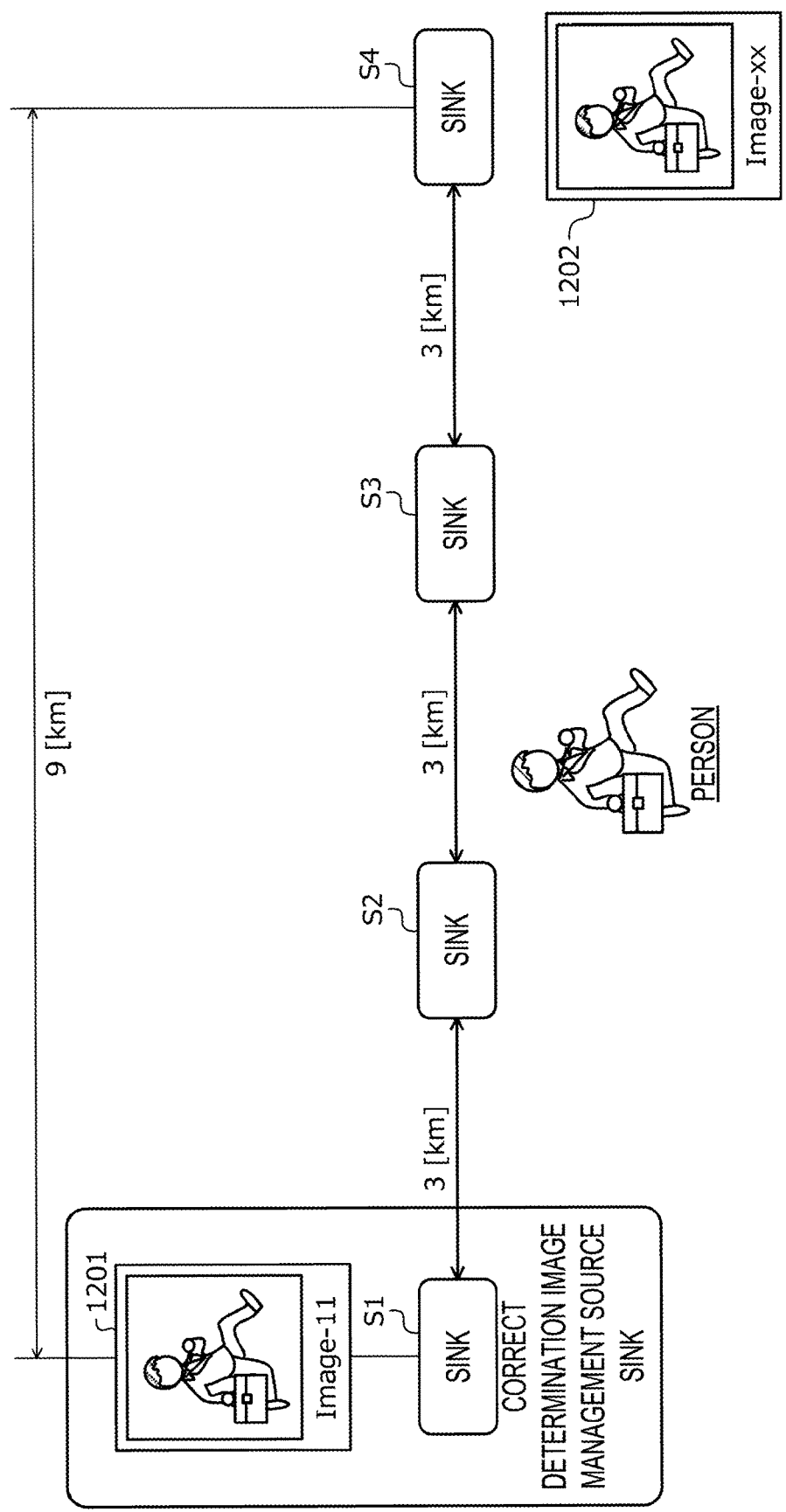
FIG. 12 is an explanatory view illustrating an inter-sink physical positional relationship.

FIG. 12 is an explanatory view illustrating the physical positional relationship between sinks. FIG. 12 illustrates the physical positional relationship between the sinks S1 to S4. Here, the sink S1 is the management source sink of a correct determination image 1201. The correct determination image 1201 is an image containing the recognition object "person."

Here, it is assumed that the distance between the sinks S1 and S2 is 3 [km], the distance between the sinks S2 and S3 is 3 [km], and the distance between the sinks S3 and S4 is 3 [km]. It is also assumed that the lower limit threshold θ is "0.8" and the constant number "t" included in the above expression (1) is "1 [h]." The movement speed of the recognition object "person" is 6 [km/h].

Hereinafter, a case of calculating an accuracy threshold value A4 of the sink S4 will be described as an example. The distance between the sinks S1 and S4 is 9 [km]. In this case, "d" included in the above expression (1) is "d=9 [km]." The σ (v, t) is "σ (v, t)=6 [km/h]×1 [h]=6 [km]."

Therefore, the existence probability P4 of the sink S4 is "P4=0.32" from the above expression (1). Then, the accuracy threshold value A4 of the sink S4 is "A4=θ(1−P4)=0.8(1−0.32)≈0.54" from the above expression (2). The threshold value A4 "0.54" indicates that the probability that an image 1202 containing the recognition object "person" captured by the camera C4 corresponding to the sink S4 exists within one hour before and after the timing when the correct determination image 1201 was captured is 54%.

[Various Procedures of Data Collection System 100]

Next, various procedures of the data collection system 100 will be described. First, an image recognition result registration procedure of an edge device Ei will be described.

[Image Recognition Result Registration Procedure of Edge Device Ei]

Figure 13:
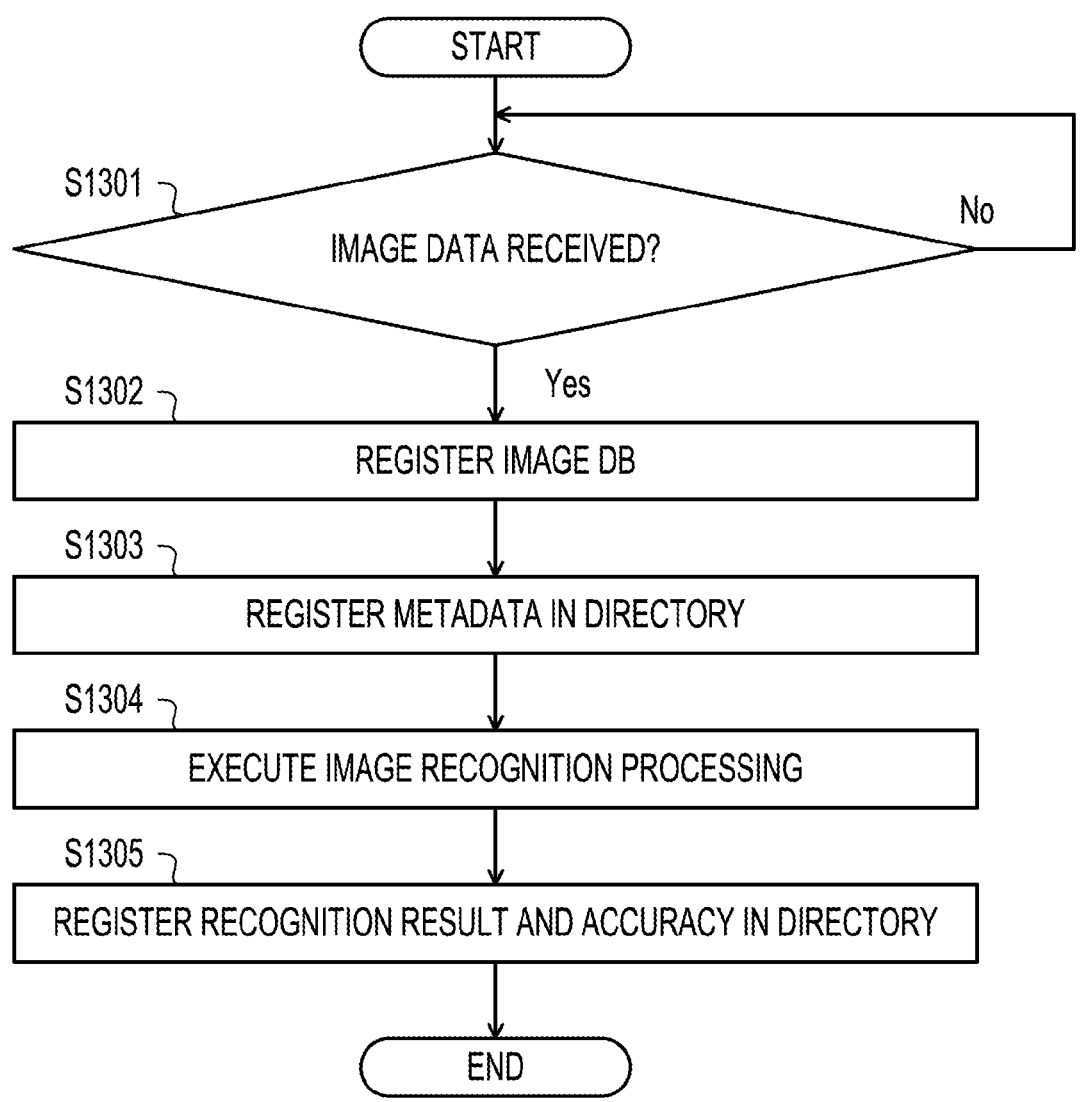
FIG. 13 is a flowchart illustrating an example of an image recognition result registration procedure of an edge device.

FIG. 13 is a flowchart illustrating an example of the image recognition result registration procedure of the edge device Ei. In the flowchart of FIG. 13, first, the edge device Ei determines whether or not the image data of an image captured by a camera Ci has been received by a sink Si (operation S1301).

Here, the edge device Ei waits for reception of the image data by the sink Si ("No" in operation S1301). Then, when the image data by the sink Si is received ("Yes" in operation S1301), the edge device Ei registers the image management information of the received image data in the image DB 210 (operation S1302).

Next, the edge device Ei registers metadata (attribute information and position information) of the image in the image attribute management DB 220 of the directory DR by the sink Si (operation S1303). Then, the edge device Ei executes image recognition processing on the image data received by the sink Si according to an image recognition application Ai (operation S1304).

Next, the edge device Ei registers the recognition result and the accuracy as the attribute information of the image in the image attribute management DB 220 of the directory DR by the image recognition application Ai (operation S1305), and ends the series of processes according to the flowchart.

As a result, each time the image data of an image captured by the camera Ci is received, the image data may be registered in the image DB 210, and the metadata (attribute information and position information) of the image may be registered in the image attribute management DB 220 of the directory DR.

[Data Collection Procedure of Information Processing Apparatus 101]

Next, a data collection procedure of the information processing apparatus 101 will be described with reference to FIG. 14.

Figure 14:
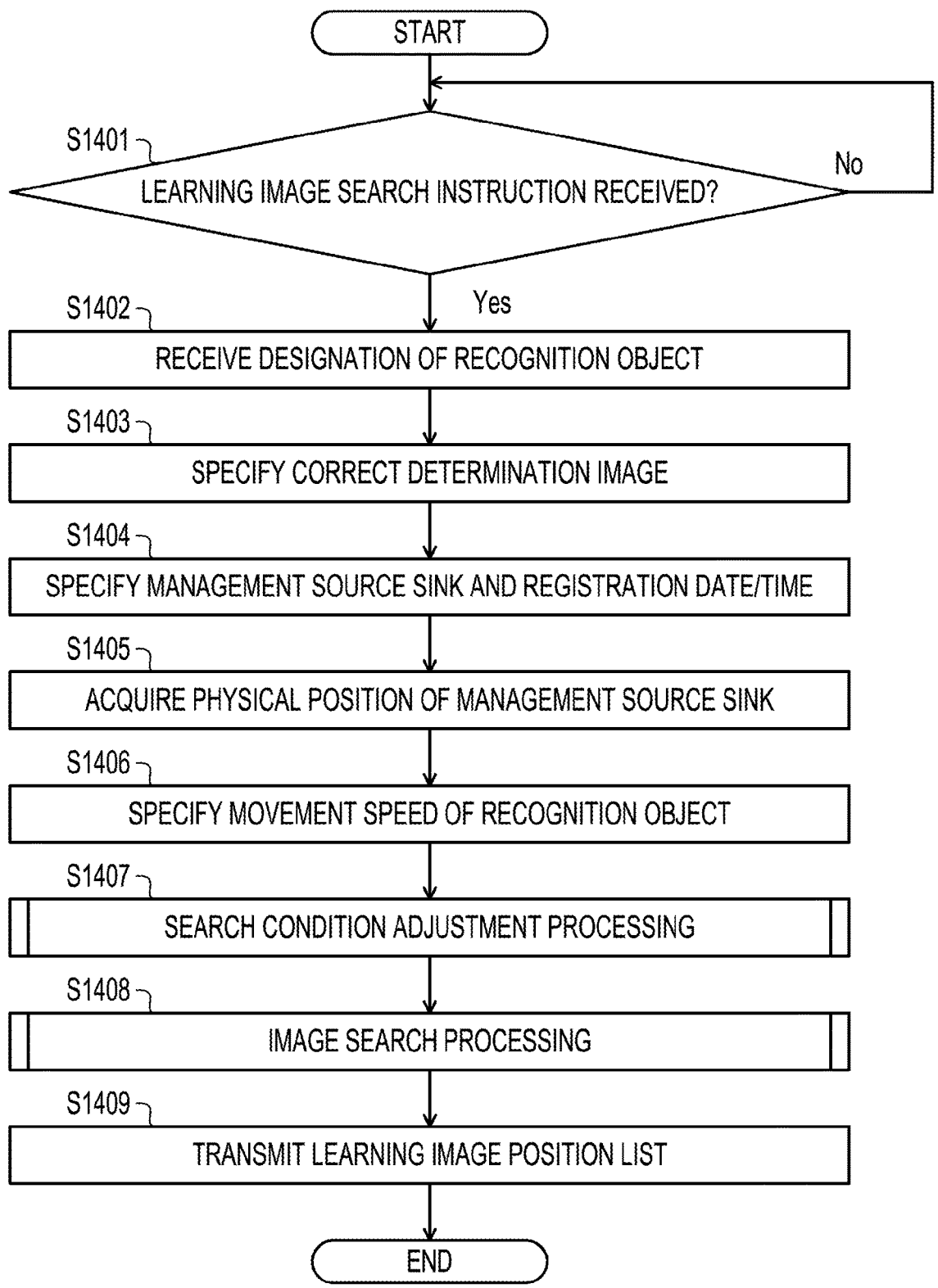
FIG. 14 is a flowchart illustrating an example of a data collection procedure of the information processing apparatus.

FIG. 14 is a flowchart illustrating an example of the data collection procedure of the information processing apparatus 101. In the flowchart of FIG. 14, first, the information processing apparatus 101 determines whether or not a learning image search instruction has been received from the administrator terminal 102 (operation S1401). Here, the information processing apparatus 101 waits for receiving the learning image search instruction ("No" in operation S1401).

Then, when it is determined that the learning image search instruction has been received ("Yes" in operation S1401), the information processing apparatus 101 receives a designation of a recognition object RO specified from the learning image search instruction (operation S1402). Next, the information processing apparatus 101 specifies a correct determination image containing the recognition object RO from an image ID included in the learning image search instruction (operation S1403).

Then, the information processing apparatus 101 specifies a management source sink Sx and a registration date/time at which the specified correct determination image is registered (operation S1404). Next, the information processing apparatus 101 refers to the sink position management DB 120 to acquire the physical location of the specified management source sink Sx (operation S1405). Next, the information processing apparatus 101 refers to the movement characteristic table 130 to specify the movement speed of the recognition object RO (operation S1406).

Then, based on the physical position of the specified management source sink Sx and the movement speed of the recognition object RO, the information processing apparatus 101 executes a search condition adjustment processing for adjusting a search condition (accuracy threshold value Ai) for searching for an image containing the recognition object RO registered in each sink Si (operation S1407). A specific procedure of the search condition adjustment processing will be described later with reference to FIG. 15.

Next, the information processing apparatus 101 executes an image search processing for searching for an image containing the recognition object RO registered in each sink Si based on the adjusted search condition (operation S1408). A specific procedure of the image search processing will be described later with reference to FIG. 16.

Then, based on the search result, the information processing apparatus 101 transmits the learning image position list 1100 to the administrator terminal 102 (operation S1409)

and ends the series of processing according to this flowchart. As a result, it is possible to provide information on images useful for learning of the image recognition model to the administrator of the data collection system 100.

Next, a specific procedure of the search condition adjustment processing of operation S1407 illustrated in FIG. 14 will be described with reference to FIG. 15.

Figure 15:
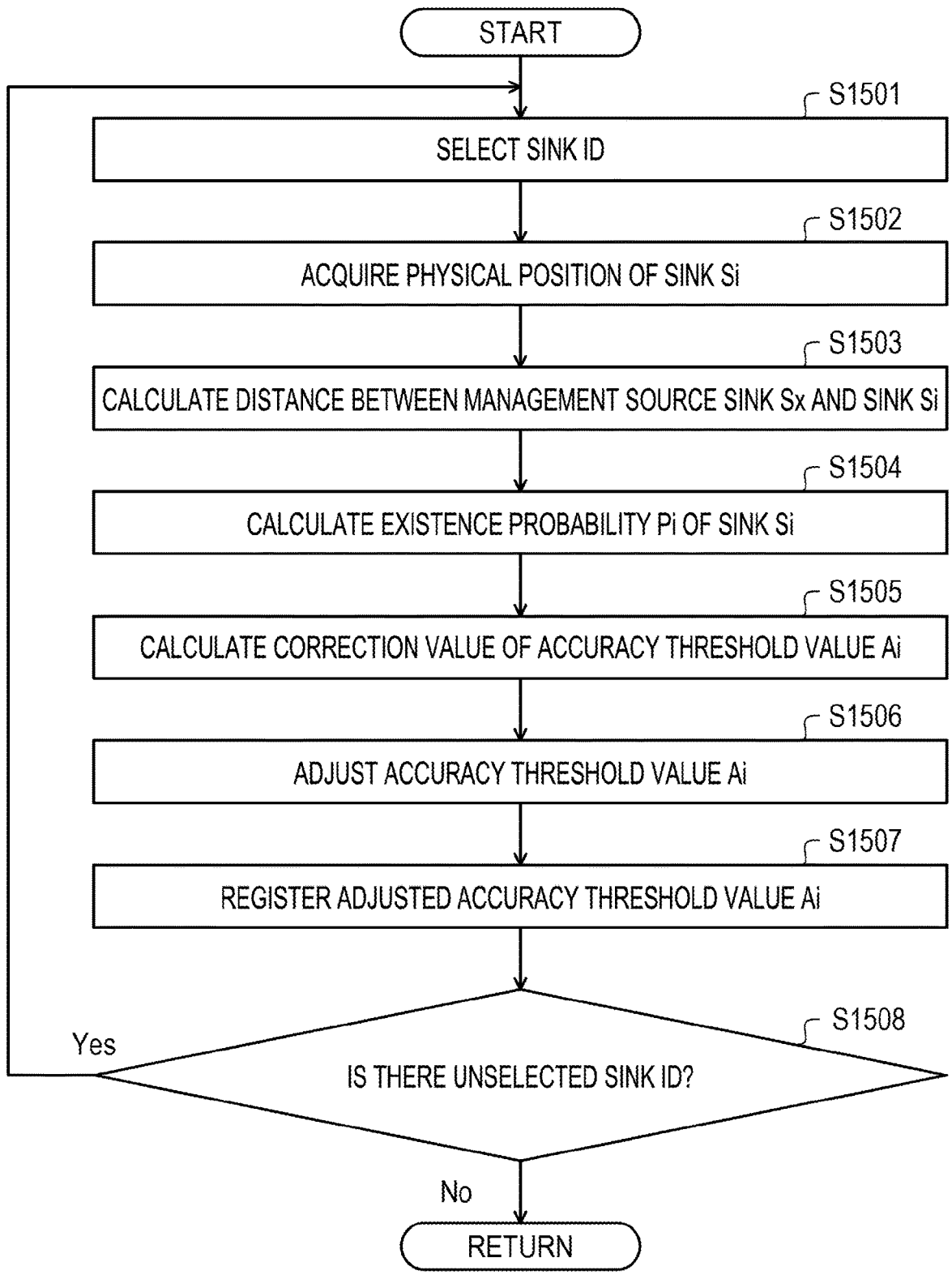
FIG. 15 is a flowchart illustrating an example of a specific procedure of a search condition adjustment processing.

FIG. 15 is a flowchart illustrating an example of the specific procedure of the search condition adjustment processing. In the flowchart of FIG. 15, first, the information processing apparatus 101 selects an unselected sink ID that has not been selected from the sink position management DB 120 (operation S1501).

Then, the information processing apparatus 101 refers to the sink position management DB 120 to acquire the physical location of the sink Si of the selected sink ID (operation S1502). Next, the information processing apparatus 101 calculates the distance between the management source sink Sx and the sink Si based on the acquired physical position of the management source sink Sx and the acquired physical position of the sink Si (operation S1503).

Then, based on the calculated distance between the management sink Sx and the sink Si and the movement speed of the specified recognition object RO, the information processing apparatus 101 calculates the existence probability Pi of the sink Si (operation S1504) using the above expression (1) (operation S1504). The value of the constant number "t" included in the above expression (1) may be set in advance or may be included in the learning image search instruction.

Next, the information processing apparatus 101 calculates a correction value of the accuracy threshold value Ai based on the calculated existence probability Pi (operation S1505). The correction value is, for example, (1−Pi) included in the above expression (2). Then, the information processing apparatus 101 adjusts the accuracy threshold value Ai based on the calculated correction value using the above expression (2) (operation S1506). The value of the lower limit threshold value θ included in the above expression (2) may be set in advance or may be included in the learning image search instruction.

Next, the information processing apparatus 101 registers the adjusted accuracy threshold value Ai in the search condition table 1000 in association with the selected sink ID (operation S1507). The recognition object type and the registration object date/time of the correct determination image are also registered in the search condition table 1000. Then, the information processing apparatus 101 determines whether or not there is an unselected sink ID which has not been selected from the sink position management DB 120 (operation S1508).

Here, when it is determined that there is an unselected sink ID ("Yes" in operation S1508), the information processing apparatus 101 returns to operation S1501. Meanwhile, when it is determined that there is no unselected sink ID ("No" in operation S1508), the information processing apparatus 101 returns to operation S1408 which calls the search condition adjustment processing.

As a result, it is possible to adjust the accuracy threshold value Ai as the search condition according to the existence probability Pi in which the image containing the recognition object RO estimated from the movement speed of the recognition object RO is registered in the sink Si.

Next, a specific procedure of the image search processing in operation S1408 illustrated in FIG. 14 will be described with reference to FIG. 16.

Figure 16:
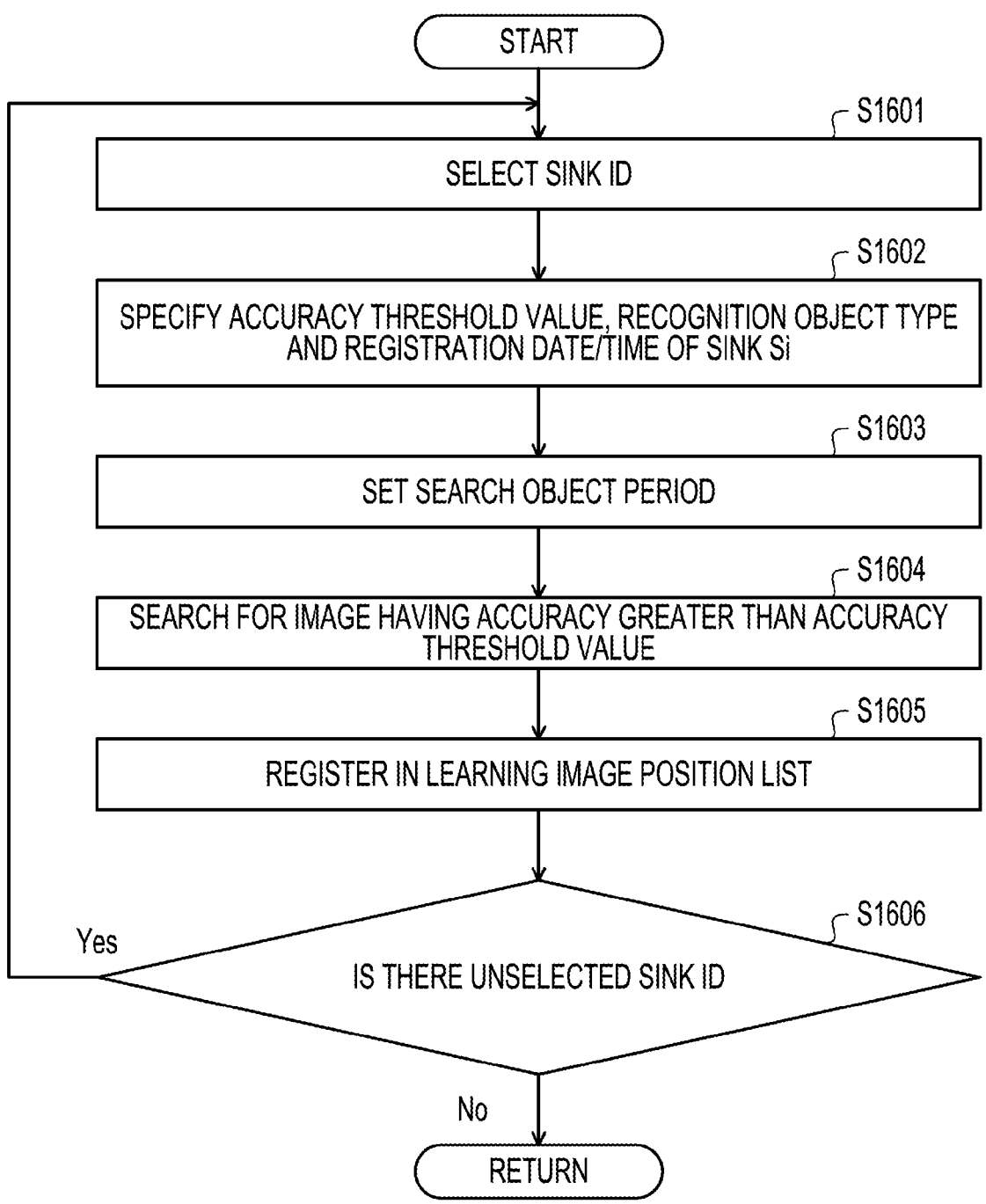
FIG. 16 is a flowchart illustrating an example of a specific procedure of an image search processing.

FIG. 16 is a flowchart illustrating an example of the specific procedure of the image search processing. In the flowchart of FIG. 16, first, the information processing apparatus 101 selects an unselected sink ID that has not been selected from the sink position management DB 120 (operation S1601).

Then, the information processing apparatus 101 refers to the search condition table 1000 to specify an accuracy threshold value, a recognition object type, and a registration date/time of the sink Si of the selected sink ID (operation S1602). Next, the information processing apparatus 101 sets a search object period according to the specified registration date/time (operation S1603).

Then, the information processing apparatus 101 refers to the image attribute management DB 220 of the directory DR to search for an image which is captured within the set search object period and has the accuracy greater than the specified accuracy threshold value, among the images containing the recognition object RO registered in the sink Si (operation S1604).

Next, the information processing apparatus 101 registers the searched search result (management source sink ID/image ID) in the learning image position list 1100 (operation S1605). Then, the information processing apparatus 101 determines whether or not there is an unselected sink ID which has not been selected from the sink position management DB 120 (operation S1606).

Here, when it is determined that there is an unselected sink ID ("Yes" in operation S1606), the information processing apparatus 101 returns to operation S1601. Meanwhile, when it is determined that there is no unselected sink ID ("No" in operation S1606), the information processing apparatus 101 returns to operation S1409 which calls the image search processing.

As a result, it is possible to search for images with a high possibility that the recognition object (recognition object RO) failed in recognition among the images registered in each sink Si is captured.

[Learning Image Determination Procedure of Administrator Terminal 102]

Next, a learning image determination procedure of the administrator terminal 102 will be described with reference to FIG. 17. The learning image determination processing of the administrator terminal 102 is executed, for example, periodically or at a predetermined timing.

Figure 17:
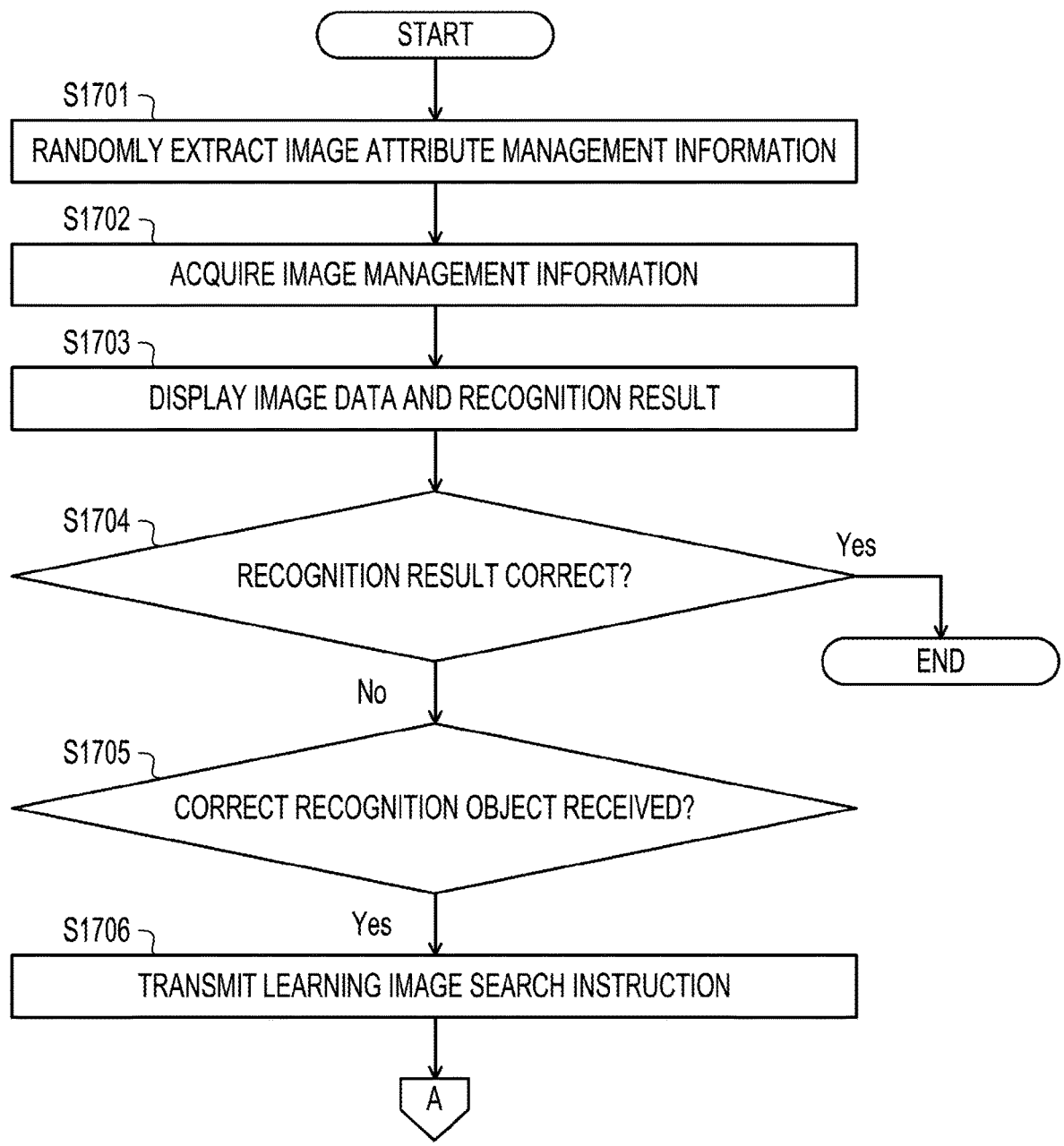
FIG. 17 is a flowchart (Part 1) illustrating an example of a learning image determination procedure of an administrator terminal.
Figure 18:
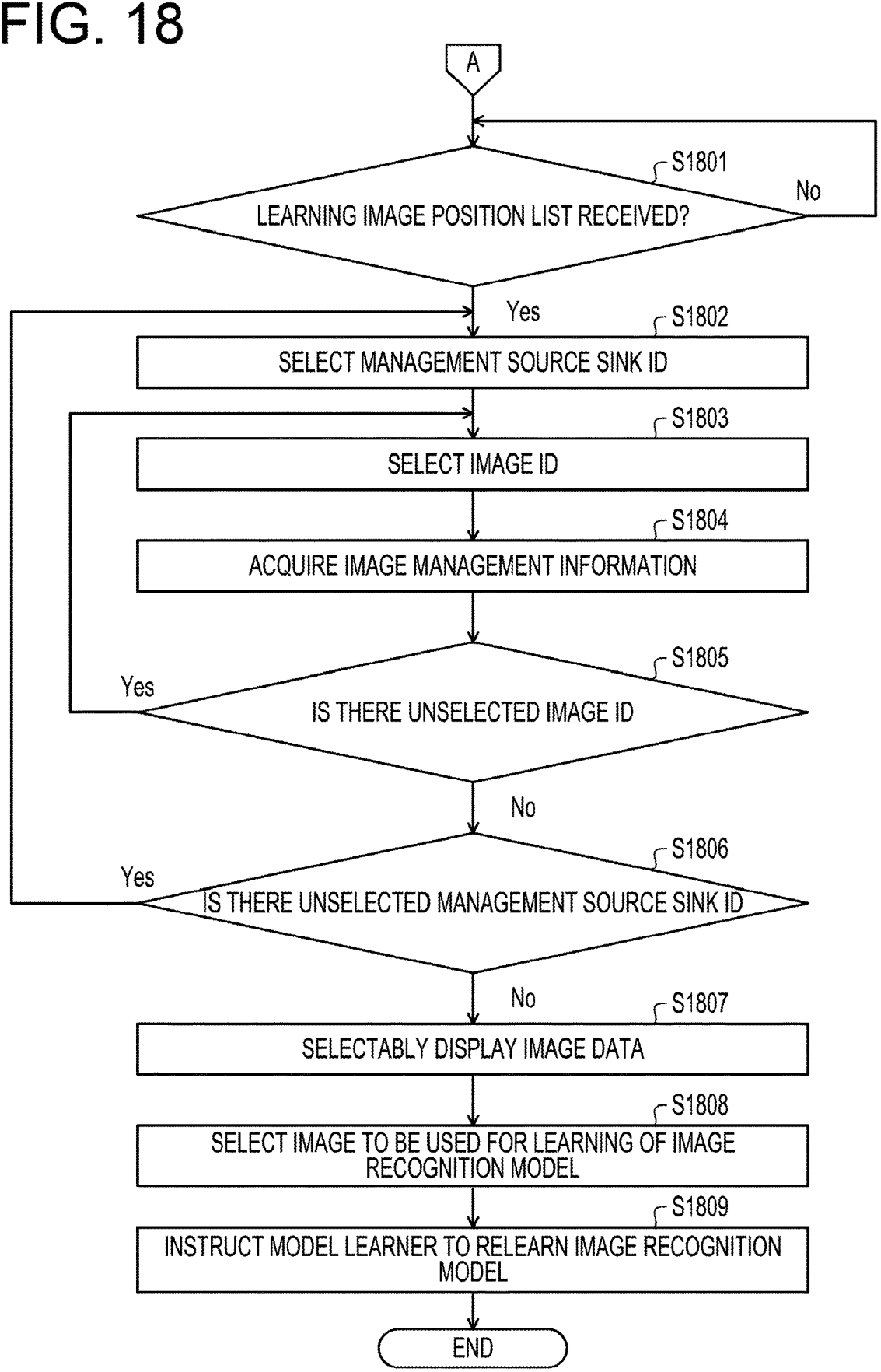
FIG. 18 is a flowchart (Part 2) illustrating an example of a learning image determination procedure of an administrator terminal.

FIGS. 17 and 18 are flowcharts illustrating an example of the learning image determination procedure of the administrator terminal 102. In the flowchart of FIG. 17, first, the administrator terminal 102 randomly extracts the image attribute management information from the image attribute management DB 220 of the directory DR (operation S1701).

Next, the administrator terminal 102 acquires the image management information corresponding to the image ID included in the attribute information of the extracted image attribute management information from the image DB 210 of the sink Si specified from the sink position of the extracted image attribute management information (operation S1702). Then, the administrator terminal 102 displays the image data included in the acquired image management information and the recognition result included in the attribute information of the extracted image attribute management information (operation S1703).

Next, the administrator terminal 102 determines whether or not a determination result indicating that the displayed recognition result is correct has been received by the administrator's operation input (operation S1704). Here, when it is determined that a determination result indicating that the recognition result is correct has been received ("Yes" in operation S1704), the administrator terminal 102 ends the series of processing according to this flowchart.

Meanwhile, when it is determined that a determination result indicating that the recognition result is incorrect has been received ("No" in operation S1704), the administrator terminal 102 determines whether or not a designation of a correct recognition object contained in the image has been received (operation S1705). Here, the administrator terminal 102 waits for receiving the designation of a correct recognition object ("No" in operation S1705).

Then, when it is determined that the designation of a correct recognition object has been received ("Yes" in operation S1705), the administrator terminal 102 transmits a learning image search instruction to the information processing apparatus 101 (operation S1706) and proceeds to operation S1801 as illustrated in FIG. 18. The learning image search instruction includes, for example, the image ID, the registration date/time, and the recognition object type of the correct determination image.

In the flowchart of FIG. 18, first, the administrator terminal 102 determines whether or not the learning image position list 1100 has been received from the information processing apparatus 101 (operation S1801). Here, the administrator terminal 102 waits for receiving the learning image position list 1100 ("No" in operation S1801).

Then, when it is determined that the learning image position list 1100 has been received ("Yes" in operation S1801), the manager terminal 102 selects an unselected management source sink ID which has not been selected from the learning image position list 1100 (operation S1802). Next, the manager terminal 102 selects an unselected image ID among the image IDs corresponding to the selected management source sink ID in the learning image position list 1100 (operation S1803).

Then, the administrator terminal 102 acquires the image management information corresponding to the selected image ID from the image DB 210 of the sink Si of the selected management source sink ID (operation S1804). The address of each sink Si may be stored in advance in the administrator terminal 102 or may be specified by accessing the image attribute management DB 220 of the directory DR.

Next, the administrator terminal 102 determines whether or not there is an unselected image ID among the image IDs corresponding to the selected management source sink ID in the learning image position list 1100 (operation S1805). When it is determined that there is an unselected image ID ("Yes" in operation S1805), the administrator terminal 102 returns to operation S1803.

Meanwhile, when it is determined that there is no unselected image ID ("No" in operation S1805), it is determined whether or not there is an unselected management source sink ID which has not been selected from the learning image position list 1100 (operation S1806). When it is determined that there is an unselected management source sink ID ("Yes" in operation S1806), the administrator terminal 102 returns to operation S1802.

Meanwhile, when it is determined that there is no unselected management source sink ID ("No" in operation S1806), the administrator terminal 102 selectably displays image data of the image management information acquired in operation S1804 (operation S1807). Next, the administrator terminal 102 selects an image to be used for learning of the image recognition model by the administrator's operation input (operation S1808).

Then, the administrator terminal 102 inputs the image data of the selected image to the model learner ML to instruct the model learner ML to relearn the image recognition model for the recognition object RO (operation S1809), and ends the series of processing according to this flowchart.

As a result, it is possible to relearn the image recognition model by picking up an image containing a recognition object (recognition object RO) failed in recognition.

As described above, according to the information processing apparatus 101 of the first embodiment, it is possible to specify a correct determination image containing a designated recognition object RO and search for an image containing the recognition object RO by referring to the storage unit 910 (for example, the image attribute management DB 220) storing the recognition result, the accuracy and the timing of an image captured at a point in association with the point, based on the point and timing at which the correct determination image was captured and the movement speed information of the recognition object RO.

As a result, in consideration of the movement speed of a recognition object RO confirmed to exist at a certain point, it is possible to search for an image containing the recognition object RO among images captured at each point and hence it is possible to efficiently collect images containing an object failed in recognition.

Further, according to the information processing apparatus 101, it is possible to adjust the accuracy threshold value A when searching for an image containing a recognition object RO captured at one of a plurality of points, based on a point at which the correct determination image was captured and the movement speed information of the recognition object RO. Then, according to the information processing apparatus 101, it is possible to search for an image having the same recognition result as the recognition object RO and having the accuracy greater than the adjusted threshold value A among images captured at any one of the points by referring to the storage unit 910, based on the timing at which the correct determination image was captured.

As a result, in consideration of the movement speed of a recognition object RO confirmed to exist at a certain point, it is possible to adjust the accuracy threshold value A when searching for an image containing the recognition object RO for each point (sink Si). Therefore, it is possible to accurately collect images containing an object failed in recognition as compared with a case where images are searched using the uniformly same accuracy threshold value (for example, the lower limit threshold value θ) at all points.

Further, according to the information processing apparatus 101, it is possible to calculate the existence probability P of an image containing the recognition object RO captured at any point based on the distance between the point at which the correct determination image is captured and any one of the plurality of points and the movement speed information on the recognition object RO. Then, according to the information processing apparatus 101, it is possible to adjust the accuracy threshold value A at any point to be reduced based on the calculated existence probability P.

As a result, it is possible to estimate a probability that a recognition object RO whose existence is confirmed at a certain point exists at each point from the movement speed of the recognition object RO and the distance between points and it is possible to adjust the accuracy threshold value A for each point based on the estimated probability. For example, it is possible to adjust the threshold value A at each point so that the higher the estimated probability is, the lower the threshold value θ set by the administrator is.

Further, according to the information processing apparatus 101, it is possible to search for an image which is captured within a period corresponding to a timing when the correct determination image was captured and has the same recognition result as the recognition object and the accuracy greater than the adjusted accuracy threshold value A, among images captured at any of a plurality of points.

As a result, for example, it is possible to search for an image containing the recognition object RO among images captured at each point with a period of several hours before and after the timing at which the existence of the recognition object RO was confirmed at a certain point as a search object period.

Further, according to the information processing apparatus 101, it is possible to output information indicating the searched result. Specifically, for example, the information processing apparatus 101 may output information (e.g., the learning image position list 1100) specifying a sink Si (or an edge device Ei) in which the image data of a searched image was registered to the administrator terminal 102 in association with the recognition object RO.

As a result, the administrator of the data collection system 100 may efficiently collect data of images containing a recognition object (recognition object RO) failed in recognition in the image recognition processing and relearns the image recognition model.

From these facts, with the information processing apparatus 101 and the data collection system 100 according to the first embodiment, it is possible to achieve efficient collection of model learning data in an image recognition system in a wide area environment.

Second Embodiment

Next, a data collection system 1900 according to a second embodiment will be described. Illustration and description of parts similar to those described in the first embodiment are omitted.

In the first embodiment, the description has been made on the case where the directory DR in the cloud CL unitarily manages the metadata (attribute/position information) of images registered in all the sinks. However, when the scale of the system becomes large, it becomes difficult to unitarily manage the metadata (attribute/position information) of images in the directory DR in the cloud CL.

Therefore, in the second embodiment, a case will be described in which a plurality of intermediate edges are provided between the cloud CL and an end edge device and the metadata (attribute/position information) of images is distributed and managed at the plurality of intermediate edges. First, an example of a system configuration of the data collection system 1900 according to the second embodiment will be described.

Figure 19:
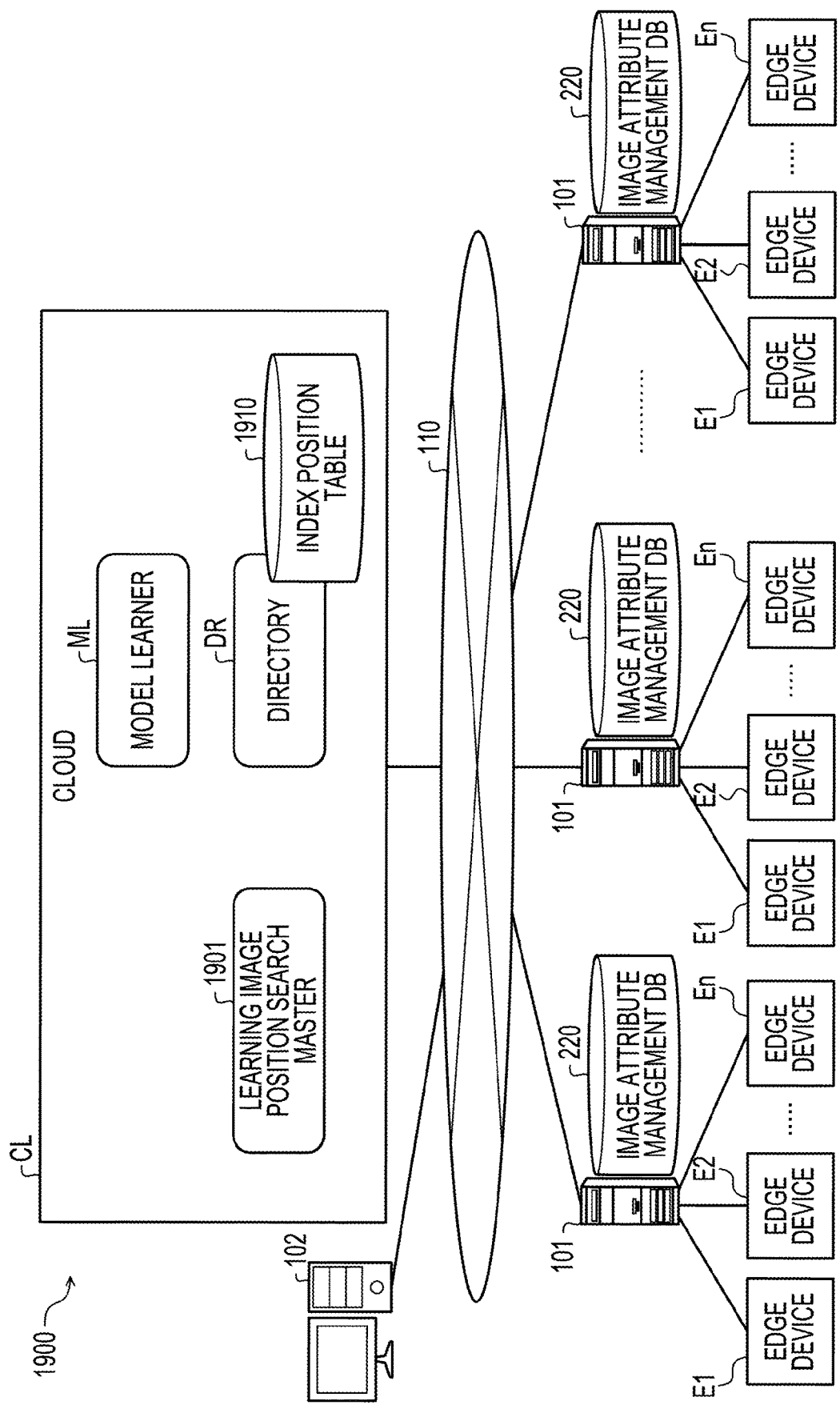
FIG. 19 is an explanatory view illustrating an example of a system configuration of a data collection system according to a second embodiment.

FIG. 19 is an explanatory view illustrating a system configuration example of the data collection system 1900 according to the second embodiment. As illustrated in FIG. 19, the data collection system 1900 includes a cloud CL, a plurality of information processing apparatuses 101, an administrator terminal 102, and a plurality of edge device groups E1 to En. The cloud CL includes a learning image position search master 1901, a model learner ML, and a directory DR.

Each of the plurality of information processing apparatuses 101 has an image attribute management DB 220 and functions as an intermediate edge. For example, each information processing apparatus 101 is installed for each area and manages the metadata (attribute/position information) of images generated within the area under their own. The area is, for example, the Kanto district, the Kinki district, or the Chugoku district.

That is, in the second embodiment, each information processing apparatus 101 plays a role like the directory DR described in the first embodiment. Since the storage contents of the image attribute management DB 220 are the same as those illustrated in FIG. 8, the description thereof will be omitted.

The directory DR has an index position table 1910 and transmits an index position list including the addresses of the plurality of information processing apparatuses 101 in response to a request from the administrator terminal 102. Here, the storage contents of the index position table 1910 will be described.

Figure 20:
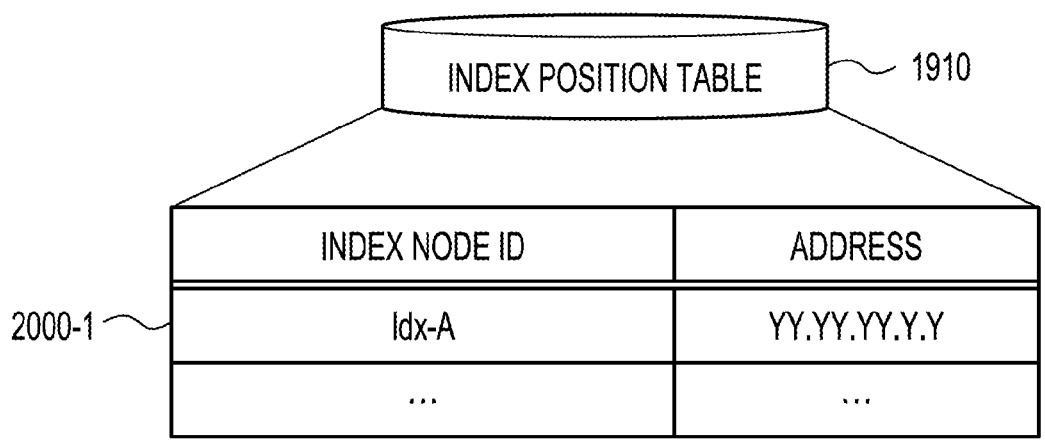
FIG. 20 is an explanatory view illustrating an example of storage contents of an index position table.

FIG. 20 is an explanatory view illustrating an example of the storage contents of the index position table 1910. As illustrated in FIG. 20, the index position table 1910 has fields of index node ID and address, and stores index position information (e.g., index position information 2000-1) as a record by setting information in each field.

Here, the index node ID is an identifier for uniquely identifying an information processing apparatus 101 serving as an intermediate edge. The address indicates the address of the information processing apparatus 101. As for the address, for example, the IP address of the information processing apparatus 101 is set. That is, in the second embodiment, the sink position information of the end edge device is not held in the directory DR.

The index position list transmitted to the administrator terminal 102 includes, for example, index position information in the index position table 1910. As a result, the administrator terminal 102 may access each information processing apparatus 101 by referring to the index position list and can search for various images (e.g., a correct determination image and a learning image) or specify an image management source sink.

The index position list may include only index position information of some information processing apparatuses 101 that match the conditions (e.g., area and image registration date/time) specified from the administrator terminal 102 among the plurality of information processing apparatuses 101. As for the conditions, for example, a region or an image registration date/time may be designated. In this case, the index position table 1910 stores information specifying an area managed by each information processing apparatus 101 and a period during which an image managed by each information processing apparatus 101 is captured.

The learning image position search master 1901 receives a learning image search instruction from the administrator terminal 102. When the learning image search instruction is received from the administrator terminal 102, the learning image position search master 1901 transfers the learning image search instruction to each information processing apparatus 101. As a result, each information processing apparatus 101 executes processing similar to the data collection processing described in the first embodiment. However, the learning image position list 1100 generated in each information processing apparatus 101 is transferred to the administrator terminal 102 via, for example, the learning image position search master 1901.

As described above, with the data collection system 1900 according to the second embodiment, it is possible to distribute and manage the metadata (attribute/position information) of images in a plurality of information processing apparatuses 101. As a result, it is possible to distribute the load on search of various images and collection of image data of learning images in a plurality of intermediate edges (information processing apparatus 101), thereby coping with a large-scaled system.

The data collection method described in the above embodiments may be implemented by executing a prepared data collection program on a computer such as a personal computer or a workstation. The data collection program may be recorded on a computer-readable recording medium such as a hard disk, a flexible disk, a CD (Compact Disc)-ROM, a MO (Magneto-Optical disk), a DVD (Digital Versatile Disk), or a USB (Universal Serial Bus) memory and may be executed by being read out from the recording medium by the computer. Further, the data collection program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a memory configured to store a recognition result, accuracy and timing of an image captured at a point; and
   a processor coupled to the memory and the processor configured to:
   specify the image configured to include a designated recognition object, and
   search for the image having a same recognition result as the recognition object by referring to the memory, based on the point and timing at which the specified image has been captured and movement speed information of the recognition object.

2. The information processing apparatus according to claim 1, wherein the processor is configured to:
   adjust a threshold value of the accuracy when the image configured to include the recognition object captured at the point of a plurality of points is searched, based on the point at which the specified image has been captured and the movement speed information of the recognition object, and
   search for the image having the same recognition result as the recognition object and the accuracy greater than the adjusted threshold value among a plurality of images captured at the plurality of points, by referring to the storage, based on the timing at which the specified image has been captured.

3. The information processing apparatus according to claim 1, wherein the processor is configured to output information to indicate a result of searching for the image.

4. The information processing apparatus according to claim 2, wherein the processor is configured to:
   calculate an existence probability of the image configured to include the recognition object captured at the one of the plurality of points, based on a distance between the point at which the specified image has been captured and the one of the plurality of points and the movement speed information of the recognition object, and
   adjust the threshold value of the accuracy so as to become smaller, based on the calculated the existence probability of the image.

5. The information processing apparatus according to claim 2, wherein the processor is configured to search for the image, by referring to the storage,
   captured within a period corresponding to the timing at which the specified image has been captured, and
   having the same recognition result as the recognition object and the accuracy greater than the adjusted accuracy threshold value among the plurality of images captured at the plurality of points.

6. The information processing apparatus according to claim 3, wherein the processor is configured to output information for specifying an apparatus in which image data of the searched image has been registered in association with the recognition object.

7. A data collection method comprising:
   specifying an image configured to include a designated recognition object; and
   searching for the image having a same recognition result as the recognition object by referring to a storage configured to store, in association with a point, a recognition result, accuracy and timing of an image captured at the point, based on the point and timing at which the specified image has been captured and movement speed information of the recognition object, by a processor.

8. The data collection method according to claim 7, further comprising:
   adjusting a threshold value of the accuracy when the image configured to include the recognition object captured at the point of a plurality of points is searched, based on the point at which the specified image has been captured and the movement speed information of the recognition object,
   wherein the processor searches for the image having the same recognition result as the recognition object and the accuracy greater than the adjusted threshold value among a plurality of images captured at the plurality of points, by referring to the storage, based on the timing at which the specified image has been captured.

9. The data collection method according to claim 7, further comprising:
   outputting information to indicate a result of searching for the image.

10. The data collection method according to claim 9, wherein the processor outputs information for specifying an apparatus in which image data of the searched image has been registered in association with the recognition object.

11. The data collection method according to claim 8, further comprising:
    calculating an existence probability of the image configured to include the recognition object captured at the one of the plurality of points, based on a distance between the point at which the specified image has been captured and the one of the plurality of points and the movement speed information of the recognition object,
    wherein the processor adjusts the threshold value of the accuracy so as to become smaller, based on the calculated the existence probability of the image.

12. The data collection method according to claim 8, wherein the processor searches for the image, by referring to the storage,
    captured within a period corresponding to the timing at which the specified image has been captured, and
    having the same recognition result as the recognition object and the accuracy greater than the adjusted accuracy threshold value among the plurality of images captured at the plurality of points.

13. A data collection system comprising:

an edge device configured to:

acquire image data of an image captured by a camera, execute, by using an image recognition model, an image recognition processing for the acquired image data, and generate a recognition result and accuracy; and a server configured to:

receive a learning image search instruction transmitted when the recognition result generated by the edge device is incorrect, specify an image configured to include a designated recognition object failed in recognition in the image recognition processing using the image recognition model by the edge device, and search for the image having a same recognition result as the recognition object by referring to a storage configured to store, in association with a point, the recognition result, the accuracy and timing of an image captured at the point, based on the point and timing at which the specified image has been captured and movement speed information of the recognition object.

* * * * *